US012394256B2

(12) United States Patent
Aggarwal et al.

(10) Patent No.: US 12,394,256 B2
(45) Date of Patent: Aug. 19, 2025

(54) METHOD(S) AND SYSTEM(S) TO ENABLE AN IMPROVED AUTOMATED ASSISTANT SUGGESTION SERVICE FOR VEHICLE(S)

(71) Applicant: GOOGLE LLC, Mountain View, CA (US)

(72) Inventors: Ankur Aggarwal, San Jose, CA (US); Vinod Krishnan, Santa Clara, CA (US); Sriram Natarajan, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 463 days.

(21) Appl. No.: 17/579,170

(22) Filed: Jan. 19, 2022

(65) Prior Publication Data
US 2023/0230425 A1 Jul. 20, 2023

(51) Int. Cl.
*G07C 5/08* (2006.01)
*G06F 11/07* (2006.01)
*G07C 5/00* (2006.01)

(52) U.S. Cl.
CPC ........ *G07C 5/0808* (2013.01); *G06F 11/0739* (2013.01); *G07C 5/006* (2013.01);
(Continued)

(58) Field of Classification Search
CPC .. G06F 9/542; G06F 16/3329; G06F 16/3344; G06F 16/90332; G06F 8/65; G06F 40/30; G06F 11/0739; G06F 2201/835; G06F 11/3006; G06F 11/302; G06F 11/3419; G06F 11/349; G06F 11/3495; G06F 2201/81; H04W 4/029; H04W 4/12; H04W 68/02; H04L 67/62;
(Continued)

(56) References Cited

U.S. PATENT DOCUMENTS 9,417,759 B1 * 8/2016 Srinivasan ............ G06F 3/0483
10,943,463 B1 * 3/2021 Clark ................. G08B 21/0438
(Continued)

OTHER PUBLICATIONS

Vijayakumar et al., "Rating Prediction and Shilling Attack Detection Using Recommendation System" International Journal of Advanced Research in Science, Communication and Technology (IJARSCT). vol. 4, Issue 2, Apr. 2021. 5 pages.

*Primary Examiner* — Kenneth J Malkowski
(74) *Attorney, Agent, or Firm* — Gray Ice Higdon

(57) ABSTRACT

Implementations described herein relate to various techniques that enable an improved automated assistant suggestion service for vehicle(s). For example, implementations can initialize and perform a recurring system health check service to ensure a connection is maintained between at least an OEM application of an in-vehicle computing device of a given vehicle and the suggestion service accessible by the in-vehicle computing device of the given vehicle. By ensuring this connection is maintained, the suggestion service is less prone to failure and suggestion(s) may still be provided in situations when the suggestion service does fail. Additionally, or alternatively, implementations can utilize a versioning API to ensure compatibility between at least the OEM application and the suggestion service. By ensuring this compatibility, the suggestion service for the vehicle(s) is more robust to version updates and the applications need not be fully compatible.

20 Claims, 8 Drawing Sheets

(52) U.S. Cl.
CPC .......... *G07C 5/0816* (2013.01); *G07C 5/085* (2013.01); *G06F 2201/835* (2013.01)

(58) Field of Classification Search
CPC .. G05B 23/0216; G07C 5/006; G07C 5/0816; G07C 5/085; G07C 5/0808; G10L 15/22; G10L 17/14; G10L 17/22; G10L 2015/223; G10L 15/182
See application file for complete search history.

(56) References Cited

U.S. PATENT DOCUMENTS

| | | | |
|---|---|---|---|
| 2017/0092133 A1* | 3/2017 | Kato | G08G 1/166 |
| 2020/0312063 A1* | 10/2020 | Balakrishnan | B60Q 9/00 |
| 2020/0356339 A1 | 11/2020 | Krishnan et al. | |
| 2022/0021654 A1* | 1/2022 | Trentini | H04L 63/0272 |

* cited by examiner

METHOD(S) AND SYSTEM(S) TO ENABLE AN IMPROVED AUTOMATED ASSISTANT SUGGESTION SERVICE FOR VEHICLE(S)

BACKGROUND

Computing devices and their respective applications typically provide robust functionality to assist humans (referred to herein as "users") with various tasks. When a particular computing device has access to an automated assistant application, the automated assistant application can control these applications, and on behalf of the users, to perform the various tasks. In some instances, the automated assistant application may proactively provide suggestions to familiarize the users with the various tasks that the automated assistant application can perform on behalf of the users and by controlling these applications.

For example, assume the automated assistant application includes a suggestion service that interacts with at least an original equipment manufacturer (OEM) application of a vehicle via an in-vehicle computing device of the vehicle (e.g., a vehicle infotainment center, etc.). In this example, the automated assistant suggestion service can generate suggestions for respective applications that are accessible at the in-vehicle computing device, such as a first suggestion associated with controlling a media application of the in-vehicle computing device, a second suggestion associated with controlling a phone application of the in-vehicle computing device, and so on. Further, the automated assistant suggestion service can provide the suggestions to the OEM application and can cause the suggestions to be provided for presentation to a user of the vehicle via the OEM application visually and/or audibly.

However, in some instances, a connection between at least the automated assistant application and the OEM application may fail. As a result, suggestions may no longer be provided for presentation to the user until the connection is re-established. Further, in these or other instances, versions of the automated assistant application and versions of the OEM application may be updated at different rates. As a result, the versions of the automated assistant application and the versions of the OEM application may not always be fully compatible. Accordingly, there is a need in the art for an improved automated assistant suggestion service that is robust to these and other issues.

SUMMARY

Implementations described herein relate to various techniques that enable an improved automated assistant suggestion service for vehicle(s). For example, assume an original equipment manufacturer (OEM) application executing at least in part at an in-vehicle computing device of a given vehicle of a user generates a request for suggestions that are to be provided for presentation to the user of the given vehicle via the in-vehicle computing device. In this example, the OEM can transmit the request for suggestions to a suggestion service of an automated assistant application executing at least in part at the in-vehicle computing device. Further, the automated assistant application can cause the suggestion service to obtain the suggestions, which are transmitted back to the OEM application responsive to the request, and the OEM application can provide the suggestions for presentation to the user of the given vehicle via the in-vehicle computing device. Implementations can initialize and perform a recurring system health check service to ensure a connection is maintained between at least the OEM and the suggestion service of the automated assistant application. Additionally, or alternatively, implementations can utilize a versioning application programming interface (API) to ensure compatibility between at least an OEM version of the OEM application and an automated assistant version of the automated assistant application (or the suggestion service of the automated assistant application). As a result, the techniques described herein result enable the suggestion service of the automated assistant application to be more robust to failure caused by different issues.

In various implementations, the recurring system health check can be initialized when an initial request is transmitted from the OEM application to the automated assistant application, such as when the given vehicle is powered to an "on" state when the user enters the given vehicle. Notably, the system health check described herein can be performed in a recurring manner in that it can be performed periodically and/or aperiodically. Further, the recurring system health check described herein can be performed as a background process in that it can be performed while the suggestion service of the automated assistant application is being actively utilized to obtain the suggestions and/or while the suggestion service of the automated assistant application is dormant. In performing the recurring system health check of the suggestion service of the automated application, a corresponding timestamp associated a time instance, of a plurality of time instances, at which the is received and/or the recurring system health check is initialized can be stored in one or more database(s) and optionally in association with the suggestions transmitted to the OEM application responsive to the request. Further, and assuming that a subsequent time instance, of the plurality of time instances and that is subsequent to the time instance, satisfies a temporal threshold, the connection between at least the OEM application and the suggestion service of the automated assistant can be tested to determine whether the connection is maintained. Put another way, the recurring system health check can be performed to proactively determine whether the connection between at least the OEM application and the suggestion service of the automated assistant application has failed at approximately the same time that the OEM application is predicted to transmit an additional request to the suggestion service of the automated assistant application by utilizing the temporal threshold.

In some versions of those implementations, and assuming that the connection between at least the OEM and the suggestion service of the automated assistant application has been maintained, the recurring system health check can continue being performed as a background process. However, in some additional or alternative versions of those implementations, and assuming that the connection between at least the OEM and the suggestion service of the automated assistant application has failed, the connection between at least the OEM and the suggestion service of the automated assistant application can be re-established to enable the suggestions and/or additional suggestions to be provided. In some instances, and in response to the connection being re-established, the suggestion service can retrieve and re-transmit the suggestions that were previously provided to the OEM application. In these and other instances, and in response to the connection being re-established, the suggestion service can obtain additional suggestions (e.g., not based on an explicit request from the OEM application), and transmit the additional suggestions to the OEM application. Moreover, the recurring system health check can continue being performed as a background process. Accordingly, techniques described herein result in an improved suggestion service of the automated assistant application for providing the suggestions for the given vehicle.

In various implementations, an OEM version of the OEM application and an automated assistant version of the automated assistant application can be identified. Further, it can be determined whether the OEM version of the OEM application and the automated assistant version of the automated assistant application are fully compatible, backwards compatible, and/or forwards compatible based on, for instance, corresponding major version indicators, corresponding minor version indicators, and/or other version indicators of corresponding versions of these applications. In some versions of those implementations, the OEM version of the OEM application and/or the automated assistant version of the automated assistant application can be provided by the respective parties. In additional or alternative implementations, the OEM version of the OEM application and/or the automated assistant version of the automated assistant application can include semantic versions of the OEM version of the OEM application and/or the automated assistant version of the automated assistant application. In these implementations, the corresponding major version indicators can be incremented when incompatible changes are made to the OEM version of the OEM application and/or the automated assistant version of the automated assistant application, and the corresponding minor version indicators can be incremented when compatible changes are made to the OEM version of the OEM application and/or the automated assistant version of the automated assistant application.

For example, assume the OEM version of the OEM application corresponds to version 1.6 of the OEM application. In this example, "1" corresponds to the major OEM version indicator and "6" corresponds to the minor OEM version indicator. Also, for example, assume the automated assistant version of the automated assistant application corresponds to version 2.3 of the automated assistant application. In this example, "2" corresponds to the major automated assistant version indicator and "3" corresponds to the minor automated assistant version indicator. In some implementations, the OEM version of the OEM application and/or the automated assistant version of the automated assistant application may include additional or alternative version indicators that indicate patch releases, bug fixes, and/or any other indicators. Further, in the above example, it can be determined that the OEM version of the OEM application is not fully compatible with the automated assistant version, but rather that the OEM version of the OEM application is backwards compatible with the automated assistant version based on comparing the corresponding major version indicators and/or the corresponding minor version indicators. In contrast, assume the OEM version of the OEM application corresponds to version 2.3 of the OEM application and assume the automated assistant version of the automated assistant application corresponds to version 1.6 of the automated assistant application. In this example, it can be determined that the OEM version of the OEM application is not fully compatible with the automated assistant version of the automated assistant application, but rather that the OEM version of the OEM application is forwards compatible with the automated assistant version based on comparing the corresponding major version indicators and/or the corresponding minor version indicators. Lastly, assume the OEM version of the OEM application corresponds to version 2.0 of the OEM application and assume the automated assistant version of the automated assistant application corresponds to version 1.0 of the automated assistant application. In this example, it can be determined that the OEM version of the OEM application are fully compatible based on comparing the corresponding major version indicators and/or the corresponding minor version indicators.

In some versions of those implementations, the request can be processed using different APIs based on whether the OEM version of the OEM application is fully compatible, backwards compatible, or forwards compatible with the automated assistant version of the automated assistant application. For example, in implementations when it is determined that the OEM version of the OEM application is fully compatible with the automated assistant version of the automated assistant application, the request can be processed using an existing API. However, in implementations when it is determined that the OEM version of the OEM application is backwards compatible or forwards compatible with the automated assistant version of the automated assistant application, the request can be processed using a backwards compatibility version of the versioning API or a forwards compatibility version of the versioning API, respectively. The backwards compatibility version of the versioning API and the forwards compatibility version of the versioning API each include one or more unique components that enforce backwards compatibility and forwards compatibility, respectively. In particular, the one or more unique components utilize a mapping to one or more unique components to enforce the backwards compatibility and the forwards compatibility.

In various implementations, the OEM can provide an indication to the automated assistant application on when and/or how to generate and transmit the request for the suggestions to the automated assistant application. Accordingly, the suggestion service of the automated assistant application may be utilized in obtaining suggestions while the given vehicle is navigating along a particular route. In some versions of those implementations, the OEM application can periodically generate and transmit the request for the suggestions to the automated assistant application. For example, the OEM application can initially generate and transmit the request for the suggestions to the automated assistant application when the given vehicle is powered to an "on" state when the user enters the given vehicle, and subsequently generate and transmit additional requests for additional suggestions to the automated assistant application at periodic intervals (e.g., every 30 seconds, every minute, every two minutes, etc.).

In additional or alternative implementations, the OEM application can periodically generate and transmit the request for the suggestions to the automated assistant application based on one or more contextual signals associated with the given vehicle and/or the user of the given vehicle. For example, the OEM application can generate and transmit requests for suggestions based on a state of the given vehicle and/or a state of the user of the given vehicle. In this example, the state of the given vehicle and/or a state of the user of the given vehicle can be determined based on sensor data instances of sensor data generated by various sensors of the given vehicle, the in-vehicle computing device of the given vehicle, and/or other computing devices (e.g., a mobile computing device of the user of the given vehicle). The state of the given vehicle can include, for instance, the given vehicle being powered to an "on" state, whether the given vehicle is moving, whether the given vehicle is stopped, whether the given vehicle is parked, whether the given vehicle is following a particular route, whether the given vehicle includes additional occupants that are in addition to the user of the given vehicle, information associated with operation of the given vehicle, such as how much of an energy source (e.g., gas, battery, etc.) is available to the given vehicle, whether any dashboard indicators are illuminated, and/or any other signals that characterize the state of the given vehicle. Further, the state of the user of the given vehicle can include, for instance, whether the user is driving the given vehicle, whether the user is a passenger of the given vehicle, an engagement level of the user while the given vehicle is moving, an origin location of the user, a destination location of the user, a route that the user is predicted to follow from the origin location to the destination location, and/or any other signals that characterizes the state of the user.

In various implementations, when the suggestion service of the automated assistant application transmits the suggestions to the OEM application responsive to the request, the OEM application can present the suggestions for presentation to the user via the in-vehicle computing device of the given vehicle. In some versions of those implementations, the OEM application can present the suggestions for audible presentation to the user via one or more speakers of the in-vehicle computing device of the given vehicle. In additional or alternative versions of those implementations, the OEM application can present the suggestions for visual presentation to the user via a display of the in-vehicle computing device of the given vehicle. In these implementations, and although the suggestions may be obtained by the suggestion service of the automated assistant application, the OEM application can visually present one or more of the suggestions in a portion of the display of the in-vehicle computing device that is dedicated to the OEM application. Put another way, the suggestion service of the automated assistant application can donate one or more of the suggestions to the OEM application such that it appears, from the perspective of the user of the given vehicle, that the OEM application obtained the suggestions, such as suggestions that are related to operation of the given vehicle. Further, the OEM application can visually present one or more other suggestions in a portion of the display of the in-vehicle computing device that is dedicated to the automated assistant application, such as suggestions that are related to controlling automated assistant functionalities.

Although the above techniques are described with respect to the OEM application and the automated assistant application, it should be understood that is for the sake of example and is not meant to be limiting. For example, the recurring system health check and the utilization of the different versioning APIs described herein can also be applied to first-party application(s) and/or third-party application(s) that are utilized by the suggestion service of the automated assistant application in obtaining the suggestions. As used herein, the term "first-party application" may refer to a software application that is developed and/or maintained by the same entity that develops and/or maintains the automated assistant application described herein and that is distinct from the automated assistant application described herein. Further, as used herein, the term "third-party application" may refer to a software application or system that is developed and/or maintained by an entity that is different from the entity that develops and/or maintains the automated assistant described herein.

By using the techniques described herein, various technical advantages can be achieved. As one non-limiting example, techniques described herein enable a system to perform the recurring system health check to ensure that connections are maintained between the automated assistant application, and the OEM application (and optionally one or more first-party applications and/or one or more third-party applications). In the event that one or more of these connections fail, the system can re-establish the failed connections to ensure that the suggestion service of the automated assistant application can continue to provide the suggestion(s). As a result, the suggestion service of the automated assistant application is more robust to issues associated with connection failures. As another non-limiting example, techniques described herein enable a system to utilize the versioning API to enforce compatibility between the automated assistant application, and the OEM application (and optionally one or more first-party applications and/or one or more third-party applications). In the event that one or more of these applications are not fully compatible with the automated assistant application, the system can utilize different versioning APIs to enforce compatibility between these applications. As a result, the suggestion service of the automated assistant application is more robust to issues associated with different versions of different applications that are not fully compatible.

The above description is provided as an overview of only some implementations disclosed herein. Those implementations, and other implementations, are described in additional detail herein.

DETAILED DESCRIPTION OF THE DRAWINGS

Figure 1:
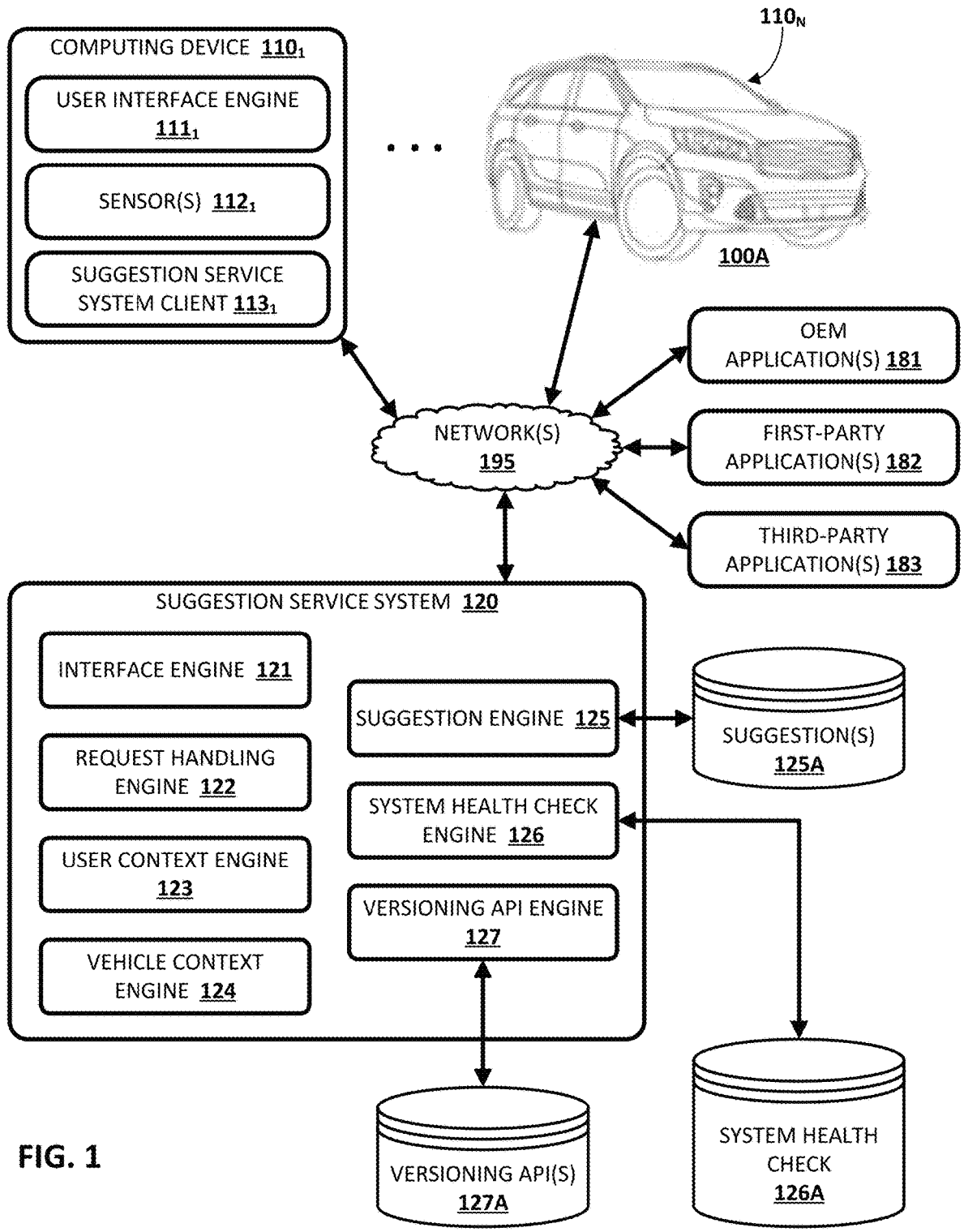
FIG. 1 depicts a block diagram of an example hardware and software environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, a suggestion service system 120 of an automated assistant application, a vehicle 100A, one or more original equipment manufacturer (OEM) applications 181, one or more first-party applications 182, and one or more third-party applications 183. Each of these components $110_{1-N}$, 120, 181, 182, and 183 may communicate, for example, through one or more networks indicated generally by 195. The one or more networks can include wired or wireless networks, such as local area networks (LANs) including Wi-Fi, Bluetooth, near-field communication, and/or other LANs, wide area networks (WANs) including the internet, and/or any other network to facilitate communication between the components depicted in FIG. 1.

In various implementations, an individual (which in the current context may also be referred to as a "user") may operate one or more of the computing devices $110_{1-N}$ to interact with other components depicted in FIG. 1. The computing devices $110_{1-N}$ may be, for example, a desktop computing device, a laptop computing device, a tablet computing device, a mobile phone computing device, an in-vehicle computing device of the vehicle 100A (e.g., an in-vehicle communications system, an in-vehicle entertainment system, and/or an in-vehicle navigation system as shown with respect to $110_N$), or a wearable apparatus that includes a computing device, such as a head-mounted display ("HMD") that provides an augmented reality ("AR") or virtual reality ("VR") immersive computing experience, a "smart" watch, and so forth. Additional and/or alternative computing devices may be provided.

Each of the computing devices $110_{1-N}$ and the suggestion service system 120 may include one or more memories for storage of data and software applications (e.g., one or more of the OEM applications 181, one or more of the first-party applications 182, and/or one or more of the third-party applications 183), one or more processors for accessing data and executing the software applications, and other components that facilitate communication over one or more of the networks 195. The operations performed by one or more of the computing devices $110_{1-N}$ and/or the suggestion service system 120 may be distributed across multiple computer systems. For example, the suggestion service system 120 may be implemented as, for example, computer programs running exclusively on or distributed across one or more computers in one or more locations that are communicatively coupled to each other over one or more of the networks 195.

One or more of the components $110_{1-N}$, 120, 181, 182, and 183 may operate a variety of different components that may be used, for instance, to improve a suggestion service of an automated assistant application as described herein. For example, a computing device $110_1$ may include user interface engine $111_1$ to detect and process user input (e.g., spoken input, typed input, and/or touch input) directed to the computing device $110_1$. As another example, the computing device $110_1$ may include one or more sensors $112_1$ to generate corresponding sensor data. The one or more sensors can include, for example, global positioning system ("GPS") sensors to generate GPS data, vision components to generate vision data in a field of view of the vision components, microphones to generate audio data based on spoken input captured in an environment of the computing device $110_1$, and/or other sensors to generate corresponding sensor data. As yet another example, the computing device $110_1$ may operate a suggestion service system client $113_1$ (e.g., which may be standalone or part of another application, such as part of a web browser) to interact with the suggestion service system 120. Further, an additional computing device $110_N$ may take the form of an in-vehicle computing device of the vehicle 100A. Although not depicted, the additional computing device $110_N$ may include the same or similar components as the computing device $110_1$. For example, the additional computing device $110_N$ may include respective instances of a user interface engine to detect and process user input, one or more sensors to generate corresponding sensor data, and/or a suggestion service system client to interact with the suggestion service system 120. Moreover, although only the computing device $110_1$ and the in-vehicle computing device $110_N$ are depicted in FIG. 1, it should be understood that is for the sake of example and additional or alternative computing devices may be provided.

In various implementations, the suggestion service system 120 may include interface engine 121, request handling engine 122, user context engine 123, vehicle context engine 124, suggestion engine 125, system health check engine 126, and versioning application programming interface (API) engine 127 as shown in FIG. 1. In some implementations, one or more of the engines 121-127 of the suggestion service system 120 may be omitted. In some implementations, all or aspects of one or more of the engines 121-127 of the suggestion service system 120 may be combined. In some implementations, one or more of the engines 121-127 of the suggestion service system 120 may be implemented in a component that is executed, in part or exclusively, remotely from one or more of the computing devices $110_{1-N}$. In some implementations, one or more of the engines 121-127 of the suggestion service system 120, or any operative portion thereof, may be implemented in a component that is executed, in part or exclusively, locally by one or more of the computing devices $110_{1-N}$.

Figure 2:
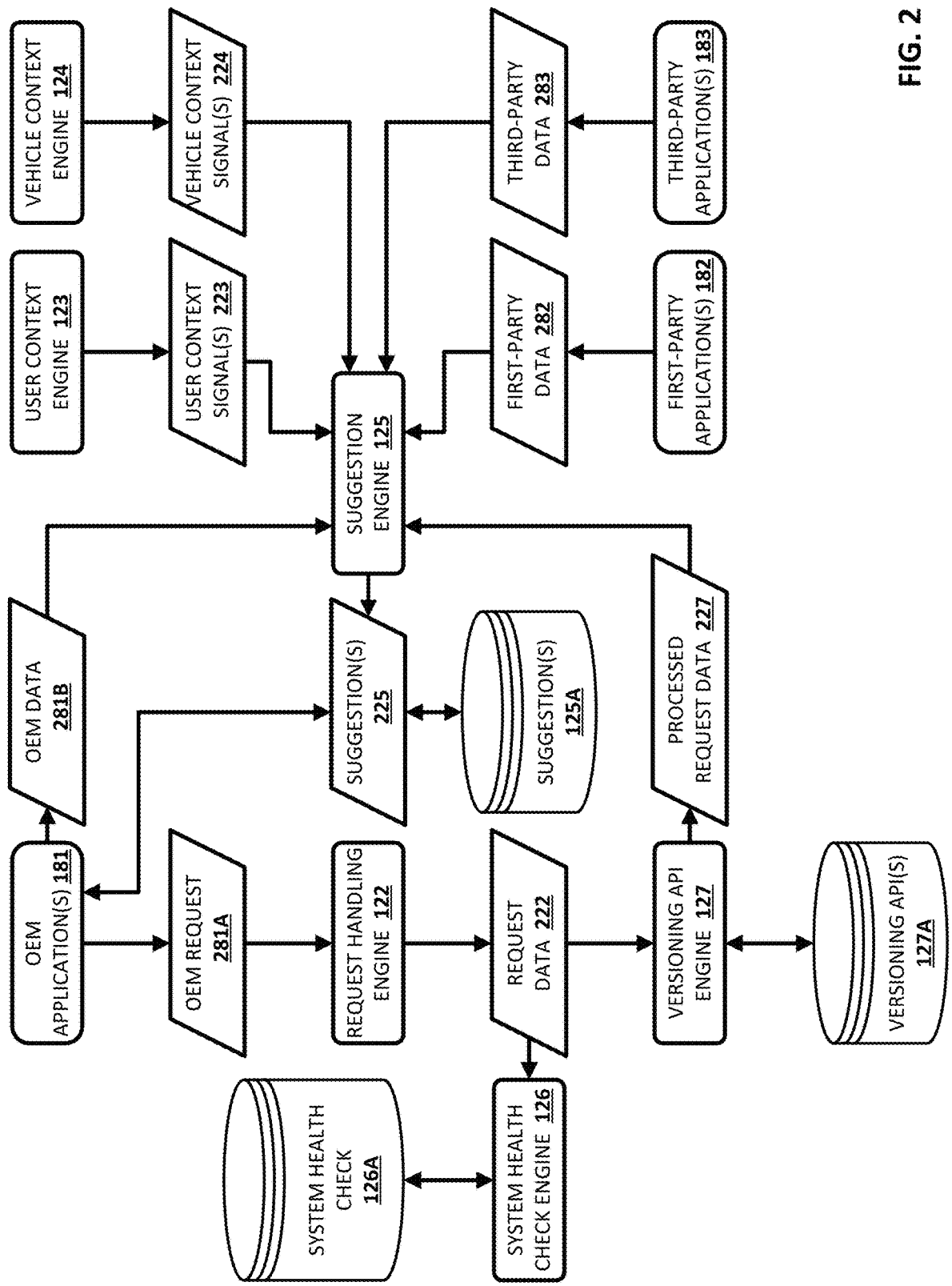
FIG. 2 depicts a process flow of an example automated assistant suggestion service that demonstrates various aspects of FIG. 1, and in which implementations disclosed herein can be implemented.

Referring to FIG. 2, a process flow of an example automated assistant suggestion service that demonstrates various aspects of FIG. 1 is depicted. The interface engine 121 (not depicted in FIG. 2) can facilitate the exchange of data to and/or from the one or more of the engines 121-127 depicted in FIGS. 1 and 2. For the sake of example, assume that a given OEM application, of the OEM application(s) 181, that associated with an OEM of the vehicle 100A of FIG. 1 generates and transmits an OEM request 281A for suggestion(s) to the suggestion service system 120. The request handling engine 122 can receive the OEM request 281A, and determine that the OEM request 281A is a request for the suggestion(s) to be provided for presentation to the user of the vehicle 100A. Further, the request handling engine 122 can generate request data 222 based on the OEM request 281A, and transmit the request data 222 to the system health check engine 126 and/or the versioning API engine 127.

In various implementations, the system health check engine 126 can initialize and perform a recurring system health check of the suggestion service system 120. Further, the system health check engine 126 can store data associated with the recurring system health in system health check database 126A. In performing the recurring system health check of the suggestion service system 120, the system health check engine 126 can ensure that connections over one or more of the networks 195 and between the automated assistant application, the OEM application(s) 181, the first-party application(s) 182, and/or the third-party application(s) 183 are maintained. In instances where the system health check engine 126 determines that one or more of these connections has failed, the system health check engine 126 can cause the failed connections to be re-established. In some of those instances, the system health check engine 126 can generate a signal (not depicted in FIG. 2) that causes the suggestion engine 125 to obtain the suggestion(s) after the failed connections are re-established.

Figure 3:
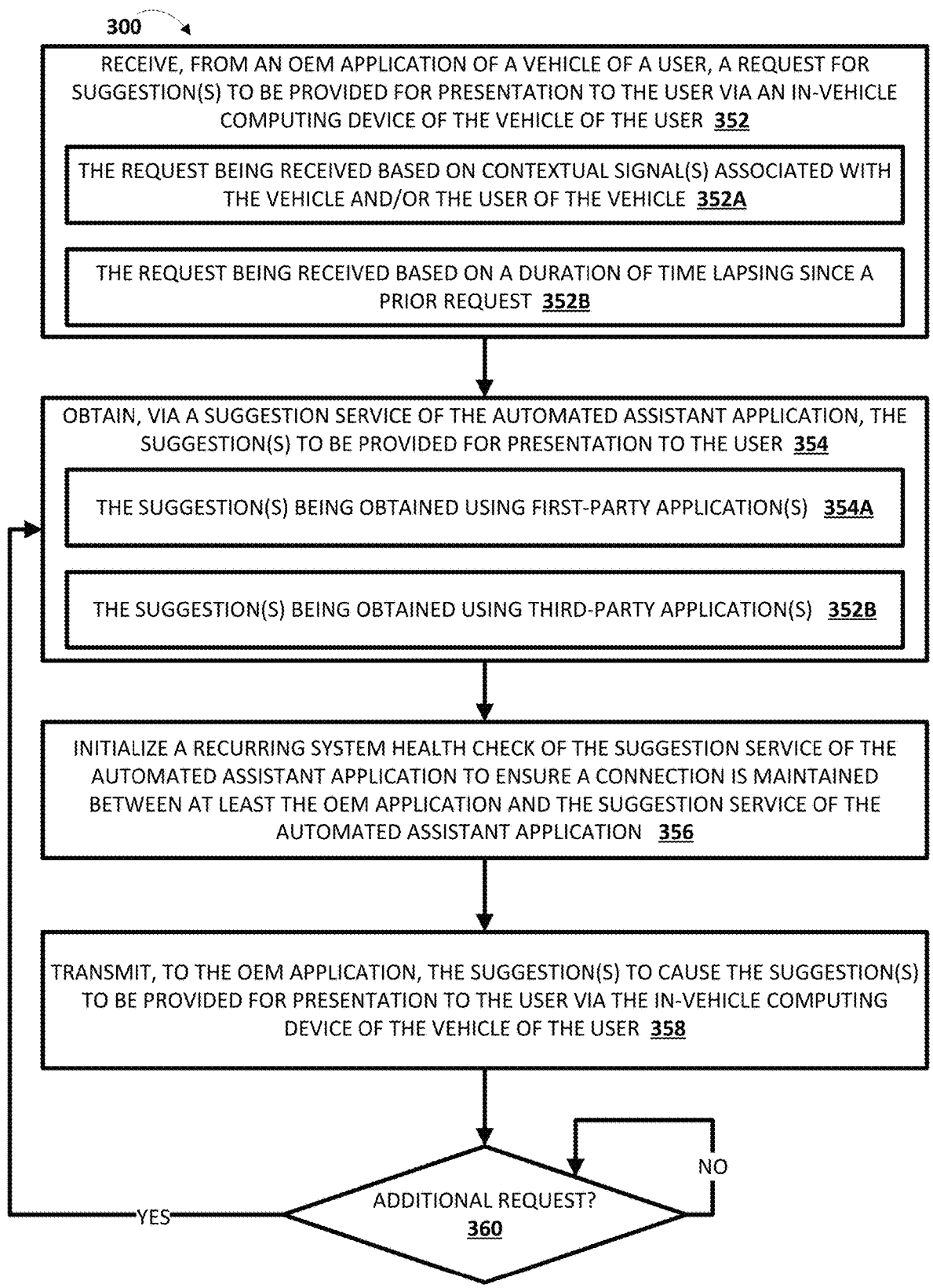
FIG. 3 depicts a flowchart illustrating an example method of initializing a health check of an automated assistant suggestion service, in accordance with various implementations.
Figure 4:
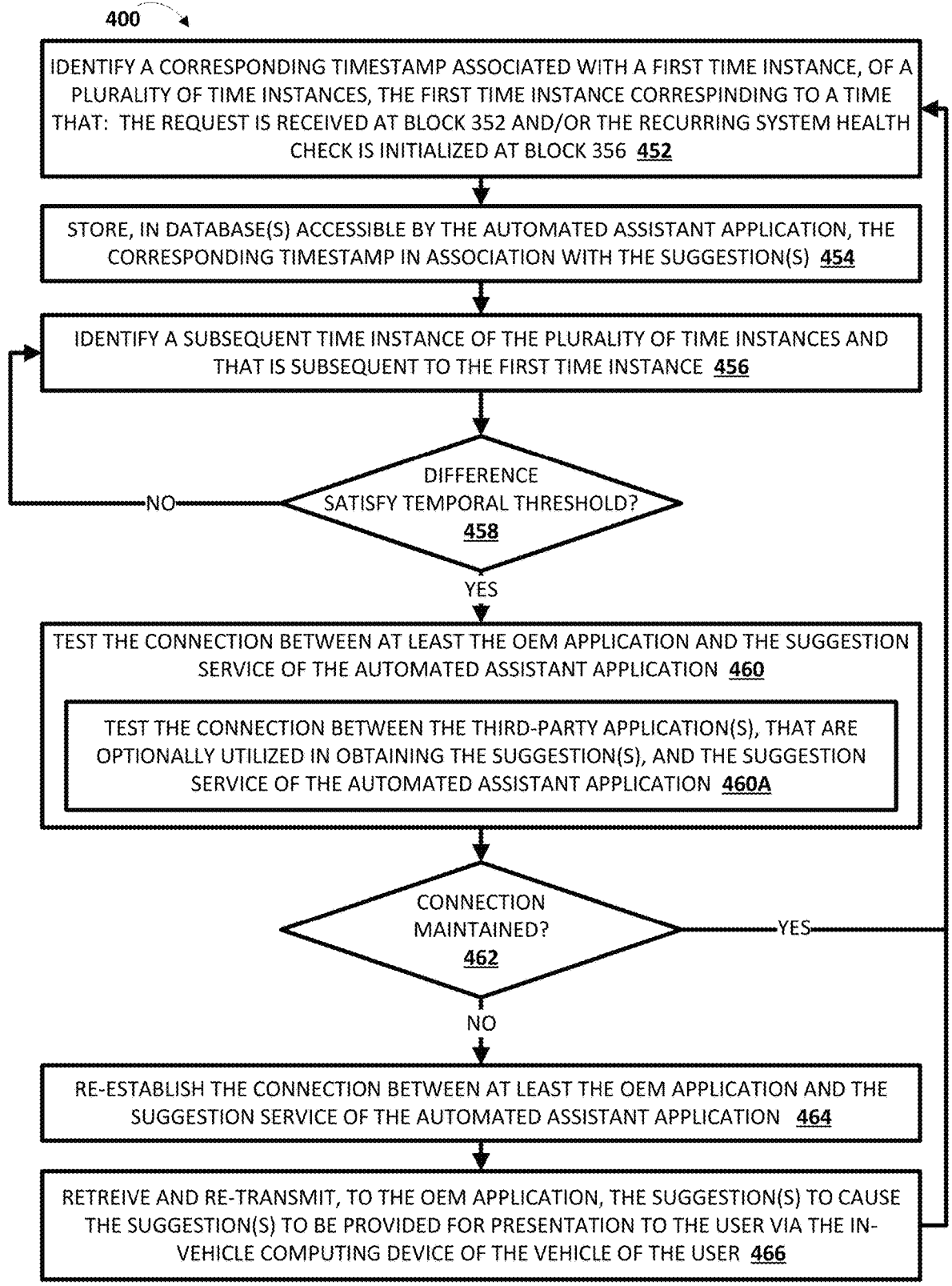
FIG. 4 depicts a flowchart illustrating an example method of performing the health check of the automated assistant suggestion service from FIG. 3, in accordance with various implementations.

Initializing and performing the recurring system health check of the suggestion service system 120 is described in more detail herein (e.g., with respect to FIGS. 3 and 4).

Notably, the system health check of the suggestion service system 120 described herein can be performed as a background process, such as while the suggestion service system 120 is being utilized to provide the suggestion(s) and/or while the suggestion service system 120 is dormant. Further, the system health check of the suggestion service system 120 described herein can be recurring in that the system health check of the suggestion service system 120 may be performed in a periodic manner or aperiodic manner (e.g., triggered based on one or more). By performing the system health check described herein, the system health check engine 127 can ensure that connections over one or more of the networks 195 and between the suggestion service system 120 of the automated assistant application and the OEM application(s) 181, the first-party application(s) 182, and/or the third-party application(s) 183 are maintained. Notably, these various applications are utilized in the process of providing the suggestion(s) to the user of the vehicle 100A. As a result, potential failures of the suggestion service system 120 of the automated assistant application in receiving request(s), obtaining suggestion(s) based on the request(s), and causing the suggestion(s) to be provided for presentation to the user of the vehicle 100A due to connectivity issues and/or other issues can be mitigated, thereby improving the suggestion service system 120 of the automated assistant application.

In additional or alternative implementations, the versioning API engine 127 can enforce compatibility between different versions of the automated assistant application, the OEM application(s) 181, the first-party application(s) 182, and/or the third-party application(s) 183. For example, the versioning API engine 127 can determine whether the automated assistant application, the OEM application(s) 181, the first-party application(s) 182, and/or the third-party application(s) 183 are fully compatible, backwards compatible, and/or forwards compatible based on, for instance, corresponding major version indicators, corresponding minor version indicators, and/or other version indicators of corresponding versions of these applications. In implementations where the versioning API engine 127 determines one or more of these applications are fully compatible, the versioning API engine 127 can process the request data 222, using an API, to generate processed request data 227, and pass the processed request data 227 along to the suggestion engine 125. In implementations where the versioning API engine 127 determines one or more of these applications are backwards compatible, the versioning API engine 127 can process the request data 222, using a backwards compatibility version of a versioning API stored in versioning API(s) database 127A, to generate a processed request data 227, and pass the processed request data 227 along to the suggestion engine 125. In implementations where the versioning API engine 127 determines one or more of these applications are forwards compatible, the versioning API engine 127 can process the request data 222, using a forwards compatibility version of the versioning API stored in the versioning API(s) database 127A, to generate a processed request data 227, and pass the processed request data 227 along to the suggestion engine 125. Determining whether these applications are fully compatible, backwards compatible, and/or forwards compatible, and subsequent processing of the request based thereon is described in more detail herein (e.g., with respect to FIGS. 5 and 6).

Notably, the different APIs and/or versioning APIs can each include one or more corresponding unique components that perform different functions in the processing of the request data 222. In implementations where the backwards compatibility version of the versioning API and/or the forwards compatibility version of the versioning API are utilized by the versioning API engine, these unique components can utilize a mapping between the different versions of the different applications. By enforcing compatibility between these applications as described herein, the versioning API engine 127 can ensure that the suggestion service system 120 of the automated assistant application is capable of processing requests from the OEM application(s) 181, the first-party application(s) 182, and/or the third-party application(s) 183 and without burdening these applications and/or developer(s) thereof in maintaining version compatibility. Notably, these various applications are utilized in the process of providing the suggestion(s) to the user of the vehicle 100A. As a result, potential failures of the suggestion service system 120 of the automated assistant application in receiving request(s), obtaining suggestion(s) based on the request(s), and causing the suggestion(s) to be provided for presentation to the user of the vehicle 100A due to versioning issues and/or other issues can be mitigated, thereby improving the suggestion service system 120 of the automated assistant application.

The suggestion engine 125 can process at least the processed request data 227 to obtain suggestion(s) 225. In some implementations, the suggestion engine 125 can obtain the suggestion(s) 225 from suggestion(s) database 125A and based on the processed request data 227. In additional or alternative implementations, the suggestion engine 125 can obtain the suggestion(s) 225 from the first-party application(s) 182 and/or the third-party application(s) 183 based on the suggestion engine 125 generating and transmitting requests to the first-party application(s) 182 and/or the third-party application(s) 183. In these implementations, the requests generated and transmitted to the first-party application(s) 182 and/or the third-party application(s) 183 can be generated based on the processed request data 227. Further, the suggestion engine 125 can transmit the suggestion(s) 225 to the given OEM application, of the OEM application(s) 181, that associated with an OEM of the vehicle 100A of FIG. 1, and the given OEM application can cause the suggestion(s) 225 to be provided for presentation to the user of the vehicle 100A. In some implementations, the suggestion engine 125 can additionally, or alternatively, store the suggestion(s) 225 in the suggestion(s) database 125A. In some versions of those implementations, the suggestion(s) 225 can be retrieved and re-transmitted to the given OEM application (e.g., in implementations where a connection between the given OEM application and the automated assistant application fails).

In various implementations, the suggestion engine 125 can additionally or alternatively process other signal(s) and/or data in obtaining the suggestion(s). For example, the suggestion engine 125 can additionally, or alternatively, process OEM data 281B from the given OEM application, user context signals(s) 223 obtained generated by the user context engine 123, vehicle context signal(s) 224 generated by the vehicle context engine 124, first-party data 282 generated by the first-party application(s), third-party data 283 generated by the third-party application(s), and/or any other signal(s) and/or data that is available to the suggestion engine 125. For instance, the OEM data 281B can be transmitted to the suggestion engine 125 along with the processed request data 227 and/or as a separate transmission as shown in FIG. 2. Further, the OEM data 281B can include any information that is accessible by the given OEM application and that is utilizable by the suggestion engine 125 in obtaining the suggestion(s) 225, such as what suggestions (if any) are being currently displayed at in-vehicle computing device of the vehicle 100A and/or other data. Similarly, the first-party data 282 and the third-party data 283 can include any information that is accessible by the first-party application(s) 182 and the third-party application(s) 183, respectively, and that is utilizable by the suggestion engine 125 in obtaining the suggestion(s) 225, such as user account data, application usage information, and/or other data.

Also, for instance, the user context signal(s) 223 can characterize a state of the user of the vehicle 100A. The state of the user of the vehicle 100A can include, for example, the user driving the vehicle 100A, the user being a passenger of the vehicle 100A, or an engagement level of the user while the vehicle 100A is moving. The state of the user of the vehicle 100A can additionally or alternatively include, for example, an origin location of the user, a destination location of the user, a route that the user is predicted to follow from the origin location to the destination location, and/or any other signals that characterizes the state of the user. Accordingly, it should be understood that the user context signal(s) 223 can be generated by the sensor(s) $112_1$ of the computing device $110_1$, sensor(s) of the in-vehicle computing device $110_N$, sensor(s) of the vehicle 100A, and/or any other data, such as the first-party data 282 from the first-party application(s) 182 and/or the third-party data 283 from the third-party application(s) 183.

Also, for instance, the vehicle context signal(s) 224 can characterize a state of the vehicle 100A. The state of the vehicle 100A can include, for example, the vehicle 100A being powered to an "on" state, whether the vehicle 100A is moving, whether the vehicle 100A is stopped, whether the vehicle 100A is parked, whether the vehicle 100A is following a particular route, or whether the vehicle 100A includes additional occupants that are in addition to the user of the vehicle 100A. The state of the user of the vehicle 100A can additionally or alternatively include, for example, information associated with operation of the vehicle 100A, such as how much of an energy source (e.g., gas, battery, etc.) is available to the vehicle 100A, whether any dashboard indicators are illuminated, and/or any other signals that characterize the state of the vehicle. Accordingly, it should be understood that the vehicle context signal(s) 224 can be generated by the sensor(s) of the in-vehicle computing device $110_N$, sensor(s) of the vehicle 100A, and/or any other data, such as the OEM data 281B from the given OEM application.

Turning now to FIG. 3, a flowchart illustrating an example method 300 of initializing a health check of an automated assistant suggestion service is depicted. For convenience, the operations of the method 300 are described with reference to a system that performs the operations. This system of the method 300 includes at least one processor, at least one memory, and/or other component(s) of computing device(s) (e.g., computing device(s) $110_{1-N}$ of FIG. 1, suggestion service system 120 of FIG. 1, computing device 810 of FIG. 8, remote server(s), and/or other computing devices). While operations of the method 300 are shown in a particular order, this is not meant to be limiting. One or more operations may be reordered, omitted, and/or added.

At block 352, the system receives, from an OEM application of a vehicle of a user, a request for one or more suggestions to be provided for presentation to the user via an in-vehicle computing device of the vehicle of the user. In some implementations, the request may be received based on one or more contextual signals associated with the vehicle and/or the user of the vehicle as indicated at block 352A. The one or more contextual signals may be generated based on sensor data instances of sensor data generated by sensors in communication with the in-vehicle computing device and/or other computing devices of the user (e.g., a mobile computing device of the user), generated based on user interactions of the user of the vehicle with the in-vehicle computing device and/or the other computing devices of the user, and/or based on another data associated with the vehicle and/or the user of the vehicle. For example, the OEM application can generate and transmit the request to the system in response to determining that one or more contextual signals associated with the vehicle and/or the user of the vehicle trigger a need to provide one or more of the suggestions for presentation to the user. For instance, a state of the vehicle can trigger the need to provide one or more of the suggestions for presentation to the user, where the state of the vehicle includes the vehicle being powered on, the vehicle moving, the vehicle stopping, the vehicle being parked, the vehicle following a particular route, and/or the vehicle including additional occupants beyond the user. Additionally, or alternatively, a state of the user can trigger the need to provide one or more of the suggestions for presentation to the user, where the state of the user includes whether the user is driving the vehicle, whether the user is a passenger of the vehicle, whether the user is an authorized user of the vehicle, and/or or an engagement level of the user while the vehicle is moving.

In additional or alternative implementations, the request may be received based on a duration of time lapsing since a prior request as indicated at block 352B. The duration of time can be a regular interval of time at which suggestions are requested (e.g., every two minutes, every five minutes, etc.). In various implementations, an OEM associated with the OEM application may specify whether to provide one or more of the suggestions in a contextual manner as described with respect to block 352A, in a periodic manner as described with respect to block 352B, and/or in any other manner.

At block 354, the system obtains, via a suggestion service of the automated assistant application, one or more of the suggestions to be provided for presentation to the user based on the request. The system obtains the suggestion at least in part based on OEM data that can be received along with the request. For example, the OEM data can include one or more of the contextual signals associated with the vehicle and/or the user of the vehicle described above. In some implementations, one or more of the suggestions are obtained using one or more first-party applications as indicated at block 354A. For instance, the system can obtain one or more of the suggestions from other software applications that share a common publisher with the automated assistant application. In additional or alternative implementations, one or more of the suggestions are obtained using one or more third-party applications as indicated at block 354B. For instance, the system can obtain one or more of the suggestions from other software applications that do not share a common publisher with the automated assistant application, including the OEM application and/or other third-party applications. In additional or alternative implementations, the system can obtain one or more of the suggestions from one or more databases that include pre-cached suggestions (e.g., suggestion(s) database 125A of FIG. 1).

At block 356, the system initializes a recurring system health check of the suggestion service of the automated assistant application to ensure a connection is maintained between at least the OEM application and the suggestion service of the automated assistant. The recurring system health check of the suggestion service of the automated assistant application is described in greater detail herein (e.g., with respect to system health check engine 126 of FIGS. 1 and 2, with respect to method 400 of FIG. 4, etc.). Notably, the recurring system health check of the suggestion service can be initialized and performed as a background process in that the system can continue obtaining suggestion(s) based on OEM request(s) while the system simultaneously initializes and performs the recurring system health check of the suggestion service.

Figure 7:
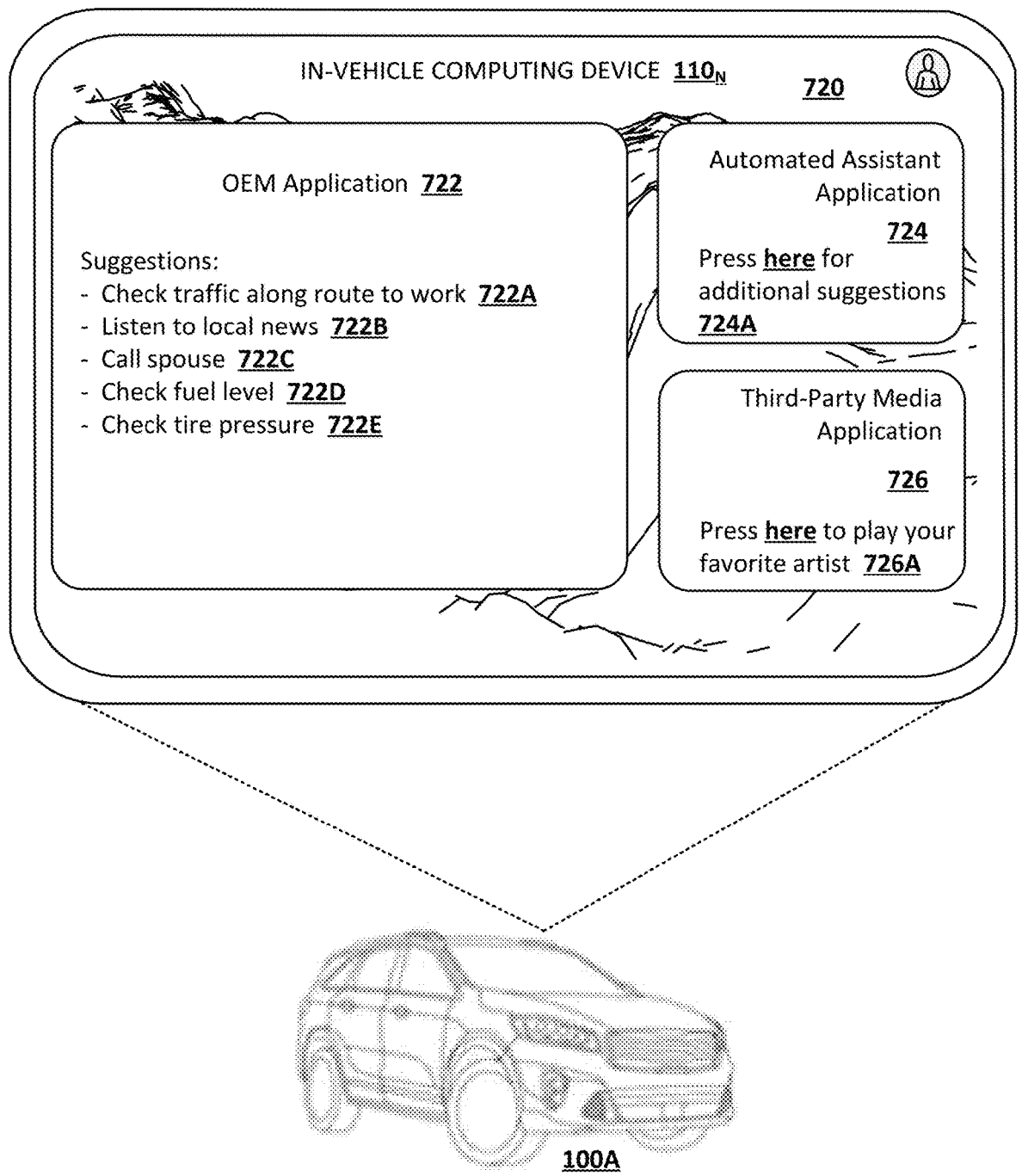
FIG. 7 depicts a non-limiting example of a display of an in-vehicle computing device that illustrates various suggestions provided for presentation to a user of a vehicle, in accordance with various implementations.

At block 358, the system transmits, to the OEM application, one or more of the suggestions to cause one or more of the suggestions to be provided for presentation to the user via the in-vehicle computing device of the vehicle of the user. The OEM application can provide one or more of the suggestions for visual display to the user via a display of the in-vehicle computing device and/or for audible presentation to the user via speaker(s) of the in-vehicle computing device. Some non-limiting examples of providing one or more of the suggestions for display to the user are shown in FIG. 7.

At block 360, the system determines whether an additional request for one or more additional or alternative suggestions to be provided for presentation to the user via the in-vehicle computing device of the vehicle of the user is received. If, at an iteration of block 360, the system determines that the additional request is not received, then the system continues monitoring for the additional request at block 360. If, at an iteration of block 360, the system determines that the additional request is received, then the system returns to block 354 to obtain, via the suggestions service, one or more of the additional or alternative suggestions to be provided for presentation to the user based on the additional request. The system may continue performing iterations of the method 300 of FIG. 3 based on further additional requests that are received.

Turning now to FIG. 4, a flowchart illustrating an example method 400 of performing the health check of the automated assistant suggestion service from FIG. 3 is depicted. For example, the method 400 of FIG. 4 can be initialized at block 356 of the method 300 of FIG. 3 and can be performed as a background process in a recurring manner. For convenience, the operations of the method 400 are described with reference to a system that performs the operations. This system of the method 400 includes at least one processor, at least one memory, and/or other component(s) of computing device(s) (e.g., computing device(s) $110_{1-N}$ of FIG. 1, suggestion service system 120 of FIG. 1, computing device 810 of FIG. 8, remote server(s), and/or other computing devices). While operations of the method 400 are shown in a particular order, this is not meant to be limiting. One or more operations may be reordered, omitted, and/or added.

At block 452, the system identifies a corresponding timestamp associated with a first time instance, of a plurality of time instances, the first time instance corresponding to a time that: the request is received at block 352 of the method 300 of FIG. 3 and/or the recurring system health check is initialized at block 356. Put another way, the system can identify an initial time instance the request was received and/or that the system health check to ensure that the system health check is subsequently performed in a recurring manner.

At block 454, the system stores, in one or more databases accessible by the automated assistant application, the corresponding timestamp in association with one or more of the suggestions. For example, the system can store one or more of the suggestions along with an indication of when one or more of the suggestions were provided for presentation to the user as indicated by the corresponding timestamp. In other implementations, the system can store the corresponding timestamp without any association to one or more of the suggestions. For example, the system can store the corresponding timestamp solely for the purpose of ensuring that the system health check is subsequently performed in a recurring manner.

At block 456, the system identifies a subsequent time instance of the plurality time instances and that is subsequent to the first time instance. The subsequent time instance can be any time instance that is subsequent to the first time instance. For example, the system can identify the subsequent time instance based on a periodic time interval (e.g., every second, every minute, and/or any other periodic time interval). Also, for example, the system can identify the subsequent time instance based on one or more contextual signals associated with the vehicle and/or the user of the vehicle, such that the system identifies the subsequent time instance in an aperiodic manner.

At block 458, the system determines whether a difference between the first time instance and the subsequent time instance satisfies a temporal threshold. In some implementations, the temporal threshold may be static, whereas in other implementations, the temporal threshold may be dynamic. In various implementations, the OEM of the vehicle may provide input that enables the OEM to define the temporal threshold as static and/or dynamic in different contextual scenarios.

If, at an iteration of block 458, the system determines that the difference between the first time instance and the subsequent time instance fails to satisfy the temporal threshold, the system returns to block 456 to identify a further subsequent time instance of the plurality of time instances and that is subsequent to both the first time instance and the subsequent time instance. The system may continue performing iterations of the operations of blocks 456 and 458 until it is determined that a given subsequent time instance satisfies the temporal threshold with respect to the first time instance. If, at an iteration of block 458, the system determines that the difference between the first time instance and the subsequent time instance satisfies the temporal threshold, then the system proceeds to block 460.

At block 460, the system tests the connection between at least the OEM application and the suggestion service of the automated assistant application. In some implementations, the system may additionally or alternatively test the connection between one or more of the third-party applications, that are optionally utilized in obtaining one or more of the suggestions, and the suggestion service of the automated assistant application as indicated at block 460A. For example, the system can utilize any known technique to test the connection between the suggestion service of the automated assistant application, and the OEM application and/or one or more of the third-party applications. Further, the system may identify one or more parameters associated with the connection between the suggestion service of the automated assistant application, and the OEM application and/or one or more of the third-party applications, such as latency, a download speed, an upload speed, and/or any other parameters associated with these connections.

At block 462, the system determines whether the connection between at least the OEM application and the suggestion service of the automated assistant application is maintained based on the testing of the connection between the suggestion service of the automated assistant application, and the OEM application and/or one or more of the third-party applications. If, at an iteration of block 462, the system determines that the connection between at least the OEM application and the suggestion service of the automated assistant application is maintained, then the system returns to block 452 to perform an additional iteration of the method 400 of FIG. 4. If, at an iteration of block 462, the system determines that the connection between at least the OEM application and the suggestion service of the automated assistant application is not maintained, then the system proceeds to block 464.

At block 464, the system re-establishes the connection between at least the OEM application and the suggestion service of the automated assistant application. Notably, in some implementations, the system may determine that the connection between the suggestion service of the automated assistant application and the OEM application is maintained, but the connection between the suggestion service of the automated assistant application and one or more of the third-party applications has failed. In these implementations, the system may return to block 452 with respect to the OEM application, but proceed to block 464 with respect to one or more of the third-party applications. In additional or alternative implementations, the system may determine that the connection between the suggestion service of the automated assistant application and the OEM application has failed, but the connection between the suggestion service of the automated assistant application and one or more of the third-party applications is maintained. In these implementations, the system may return to block 452 with respect to one or more of the third-party applications, but proceed to block 464 with respect to the OEM application.

At block 466, the system retrieves and re-transmits, to the OEM application, one or more of the suggestions to be provided for presentation to the user via the in-vehicle computing device of the vehicle of the user. The system returns to block 452 to perform an additional iteration of the method 400 of FIG. 4. Accordingly, by performing the recurring system health check of the suggestion service of the automated assistant as described herein, the system can ensure that the suggestion service of the automated assistant is robust to connectivity issues and/or other problems that may result in connectivity issues.

Figure 5:
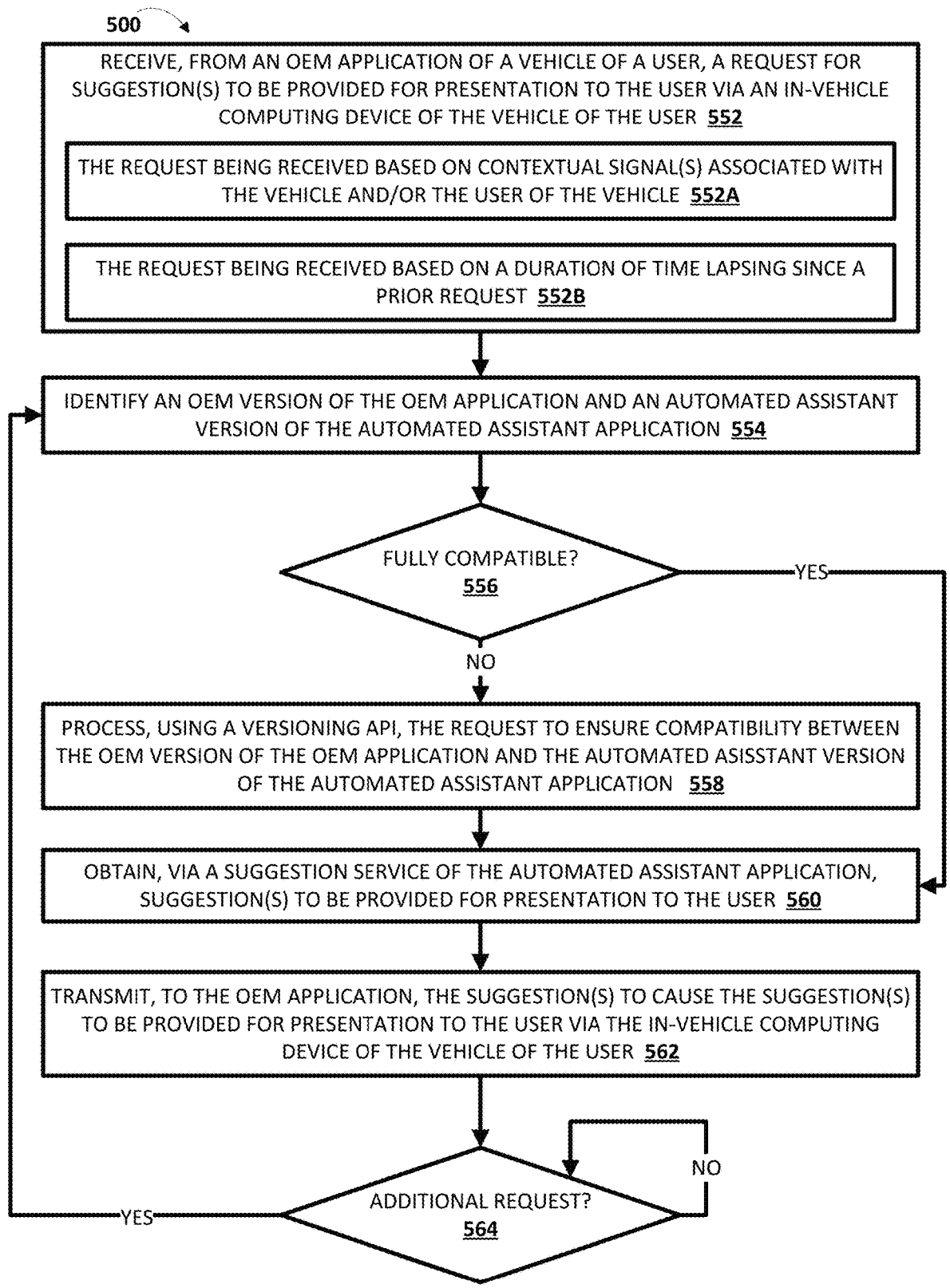
FIG. 5 depicts a flowchart illustrating an example method of ensuring compatibility between an OEM version of an OEM application and an automated assistant version of an automated assistant application, in accordance with various implementations.

Turning now to FIG. 5, a flowchart illustrating an example method 500 of ensuring compatibility between an OEM version of an OEM application and an automated assistant version of an automated assistant application is depicted. For convenience, the operations of the method 500 are described with reference to a system that performs the operations. This system of the method 500 includes at least one processor, at least one memory, and/or other component(s) of computing device(s) (e.g., computing device(s) 110$_{1-N}$ of FIG. 1, suggestion service system 120 of FIG. 1, computing device 810 of FIG. 8, remote server(s), and/or other computing devices). While operations of the method 500 are shown in a particular order, this is not meant to be limiting. One or more operations may be reordered, omitted, and/or added.

At block 552, the system receives, from an OEM application of a vehicle of a user, a request for one or more suggestions to be provided for presentation to the user via an in-vehicle computing device of the vehicle of the user. In some implementations, the request may be received based on one or more contextual signals associated with the vehicle and/or the user of the vehicle as indicated at block 552A. In additional or alternative implementations, the request may be received based on a duration of time lapsing since a prior request as indicated at block 552B. The operations of these blocks may be implemented in the same or similar manner described with respect to blocks 352, 352A, and 352B of the method 300 of FIG. 3, respectively.

At block 554, the system identifies an OEM version of the OEM application and an automated assistant version of the automated assistant application. The OEM version of the OEM application indicates at least a major OEM version indicator and a minor version indicator. Further, the automated assistant version of the automated assistant application indicates at least a major assistant application version indicator and a minor automated assistant version indicator. For example, assume the OEM version of the OEM application corresponds to version 1.6 of the OEM application. In this example, "1" corresponds to the major OEM version indicator and "6" corresponds to the minor OEM version indicator. Also, for example, assume the automated assistant version of the automated assistant application corresponds to version 2.3 of the automated assistant application. In this example, "2" corresponds to the major automated assistant version indicator and "3" corresponds to the minor automated assistant version indicator. In some implementations, the OEM version of the OEM application and/or the automated assistant version of the automated assistant application may include additional or alternative version indicators that indicate patch releases, bug fixes, and/or any other indicators.

In some implementations, the OEM version of the OEM application and/or the automated assistant version of the automated assistant application can be provided the respective parties (e.g., a third-party associated with the OEM application, such as the OEM, and a first-party associated with the automated assistant application, such as a publisher of the automated assistant). In additional or alternative implementations, the OEM version of the OEM application and/or the automated assistant version of the automated assistant application can include semantic versions of the OEM version of the OEM application provided by the OEM and/or the automated assistant version of the automated assistant application provided by the publisher of the automated assistant. In these implementations, the system can increment the major version indicators when incompatible changes are made to the OEM version of the OEM application and/or the automated assistant version of the automated assistant application, increment the minor version indicators when compatible changes are made to the OEM version of the OEM application and/or the automated assistant version of the automated assistant application, and/or increment other version indicators when other changes are made.

At block 556, determines whether the OEM version of the OEM application is fully compatible with the automated assistant version of the automated assistant application. The system may determine whether the OEM version of the OEM application is fully compatible with the automated assistant version of the automated assistant application based on comparing the major OEM version indicator of the OEM version with the major automated assistant version indicator of the automated assistant version and/or based on comparing the minor OEM version indicator of the OEM version with the minor automated assistant version indicator of the automated assistant version. For example, assume the OEM version of the OEM application corresponds to version 2.0 of the OEM application and assume the automated assistant version of the automated assistant application corresponds to version 2.0 of the automated assistant application. In this example, the system may determine that the OEM version of the OEM application is fully compatible with the automated assistant version of the automated assistant application based on the matching major version indicators of "2" (and optionally further based on the matching minor version indicators of "0"). As another example, assume the OEM version of the OEM application corresponds to version 1.0 of the OEM application and assume the automated assistant version of the automated assistant application corresponds to version 2.0 of the automated assistant application. In this example, the system may determine that the OEM version of the OEM application is not fully compatible with the automated assistant version, but rather that the OEM version of the OEM application is backwards compatible with the automated assistant version. As another example, assume the OEM version of the OEM application corresponds to version 2.0 of the OEM application and assume the automated assistant version of the automated assistant application corresponds to version 1.0 of the automated assistant application. In this example, the system may determine that the OEM version of the OEM application is not fully compatible with the automated assistant version, but rather that the OEM version of the OEM application is forwards compatible with the automated assistant version.

If, at an iteration of block 556, the system determines that the OEM version of the OEM application is not fully compatible with the automated assistant version of the automated assistant application the system proceeds to block 558. At block 558, the system processes, using a versioning API, the request to ensure compatibility between the OEM version of the OEM application and the automated assistant version of the automated assistant application. The processing of the request using the versioning API is described in greater detail herein (e.g., with respect to versioning API engine 127 of FIGS. 1 and 2, with respect to method 600 of FIG. 6, etc.). Notably, the system may not process the request using the versioning API in implementations where it is determined that the OEM version of the OEM application is fully compatible with the automated assistant version of the automated assistant application. If, at an iteration of block 556, the system determines that the OEM version of the OEM application is fully compatible with the automated assistant version of the automated assistant application the system proceeds to block 560.

At block 560, the system obtains, via a suggestion service of the automated assistant application, one or more suggestions to be provided for presentation to the user. The system can obtain one or more of the suggestions in the same or similar manner described with respect to blocks 354, 354A, and/or 354B of the method 300 of FIG. 3. At block 562, the system transmits, to the OEM application, one or more of the suggestions to cause one or more of the suggestions to be provided for presentation to the user via the in-vehicle computing device of the vehicle of the user. The system can transmit one or more of the suggestions to the OEM in the same or similar manner described with respect to block 358 of the method 300 of FIG. 3.

At block 564, the system determines whether an additional request for one or more additional or alternative suggestions to be provided for presentation to the user via the in-vehicle computing device of the vehicle of the user is received. If, at an iteration of block 564, the system determines that the additional request is not received, then the system continues monitoring for the additional request at block 564. If, at an iteration of block 564, the system determines that the additional request is received, then the system returns to block 554 to identify the OEM version of the OEM application and the automated assistant version of the automated assistant application. The system may continue performing iterations of the method 500 of FIG. 5 based on further additional requests that are received.

Figure 6:
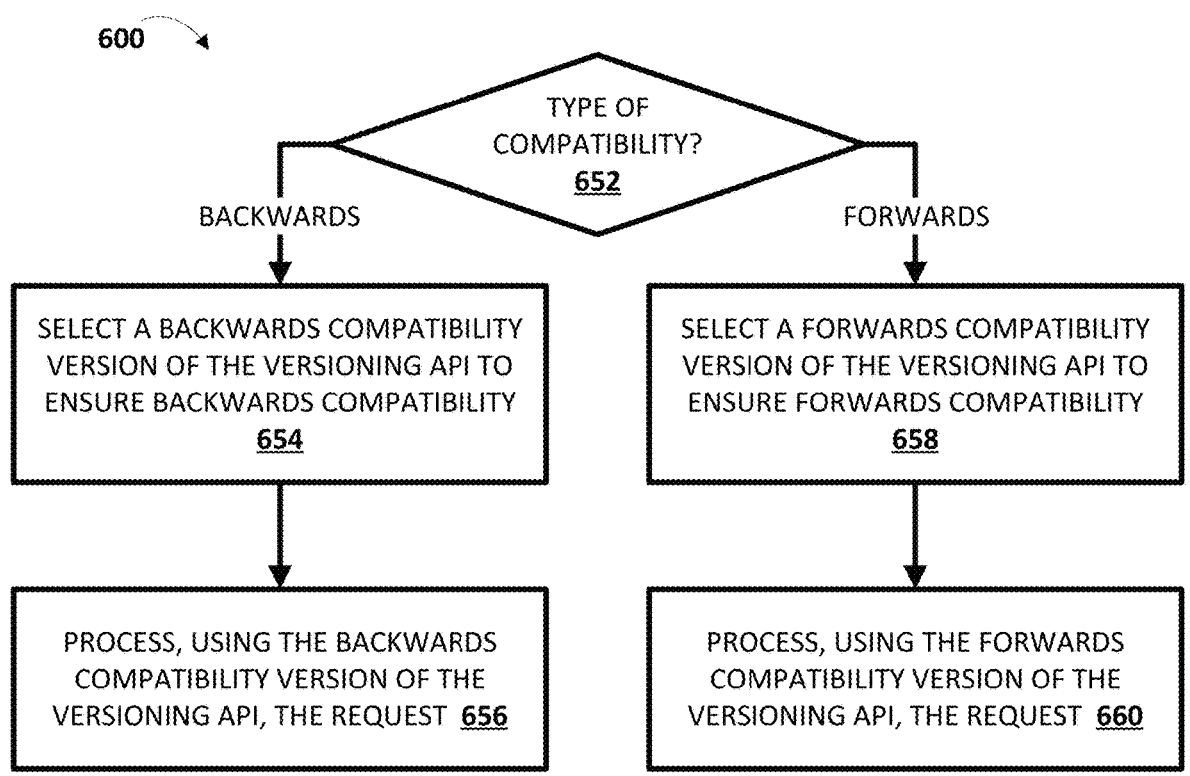
FIG. 6 depicts a flowchart illustrating an example method of ensuring compatibility between the OEM version of the OEM application and the automated assistant version of the automated assistant application from FIG. 5, in accordance with various implementations.

Turning now to FIG. 6, a flowchart illustrating an example method 600 of ensuring compatibility between the OEM version of the OEM application and the automated assistant version of the automated assistant application from FIG. 5 is depicted. For example, the method 600 of FIG. 6 can be utilized at block 558 of the method 500 of FIG. 5. For convenience, the operations of the method 600 are described with reference to a system that performs the operations. This system of the method 500 includes at least one processor, at least one memory, and/or other component(s) of computing device(s) (e.g., computing device(s) $110_{1-N}$ of FIG. 1, suggestion service system 120 of FIG. 1, computing device 810 of FIG. 8, remote server(s), and/or other computing devices). While operations of the method 600 are shown in a particular order, this is not meant to be limiting. One or more operations may be reordered, omitted, and/or added.

At block 652, the system determines a type of compatibility between the OEM version of the OEM application and the automated assistant version of the automated assistant application. The type of compatibility between the OEM version of the OEM application and the automated assistant version of the automated assistant application can be determined using any technique described herein (e.g., with respect to versioning API engine 127 of FIGS. 1 and 2, with respect to method 500 of FIG. 5, etc.) and/or other techniques.

If, at an iteration of block 652, the system determines that the OEM version of the OEM application is backwards compatible with the automated assistant version of the automated assistant application, then the system proceeds to block 654. At block 654, the system selects a backwards compatibility version of the versioning API to ensure backwards compatibility between the OEM version of the OEM application and the automated assistant version of the automated assistant application. The backwards compatibility version of the versioning API can include one or more components that are unique to the backwards compatibility version of the versioning API. These components can utilize unique mappings to enforce backwards compatibility between the OEM version of the OEM application and the automated assistant version of the automated assistant application. At block 656, the system processes, using the backwards compatibility version of the versioning API, the request.

If, at an iteration of block 652, the system determines that the OEM version of the OEM application is forwards compatible with the automated assistant version of the automated assistant application, then the system proceeds to block 658. At block 658, the system selects a forwards compatibility version of the versioning API to ensure forwards compatibility between the OEM version of the OEM application and the automated assistant version of the automated assistant application. Similarly, the forwards compatibility version of the versioning API can include one or more components that are unique to the forwards compatibility version of the versioning API and that are distinct from one or more of the components of the backwards compatibility version of the versioning API. These components can utilize unique mappings to enforce forwards compatibility between the OEM version of the OEM application and the automated assistant version of the automated assistant application. At block 660, the system processes, using the forwards compatibility version of the versioning API, the request.

Put another way, even though the OEM version of the OEM application is not fully compatible with the automated assistant version of the automated assistant application, techniques described herein can utilize different versioning APIs to enforce compatibility between the OEM version of the OEM application and the automated assistant version of the automated assistant application. Although FIGS. 5 and 6 are primarily described with respect to versioning between the OEM version of the OEM application and the automated assistant version of the automated assistant application, it should be understood that is for the sake of example and is not meant to be limiting. For instance, the same or similar techniques can be utilized to enforce compatibility between one or more corresponding third-party versions of one or more of the third-party applications and the automated assistant version of the automated assistant application.

Accordingly, techniques of the methods of FIGS. 3-6 can be utilized to improve the suggestion service of the automated assistant application. Although the recurring system health check of FIGS. 3 and 4, and the versioning of FIGS. 5 and 6 are described as separate techniques to improve the suggestion service of the automated assistant application, it should be understood that is for the sake of simplicity and is not meant to be limiting. Rather, it should be understood that these techniques can be utilized in conjunction with one another and/or other techniques to improve the suggestion service of the automated assistant application.

Turning now to FIG. 7, a non-limiting example of a display 720 of an in-vehicle computing device $110_N$ that illustrates various suggestions provided for presentation to a user of a vehicle 100A is depicted. The display 720 may include a plurality of disparate portions that are dedicated to different applications. For example, the display 720 of FIG. 7 includes a first portion 722 of the display 720 that is dedicated to an OEM application of an OEM of the vehicle 100A executing at least in part at the in-vehicle computing device $110_N$, a second portion 724 of the display 720 that is dedicated to an automated assistant application associated with an automated assistant executing at least in part at the in-vehicle computing device $110_N$, and a third portion 726 of the display 720 that is dedicated to a third-party media application associated with an example music streaming service. Although the display 720 of the of the in-vehicle computing device $110_N$ is shown in FIG. 7 is shown as having a particular configuration (e.g., multiple disparate portions dedicated to various applications), it should be understood that is for the sake of example and is not meant to be limiting. For instance, the display 720 may be configured in any desirable manner and specific to unique OEMs.

For the sake of example, assume that a user of the vehicle 100A enters the vehicle and turns the vehicle 100A to an "on" state prior to commuting to work on a weekday morning. In this example, a request for one or more suggestions to be provided for presentation to the user of the vehicle 100A can be transmitted to a suggestion service of the automated assistant application that is executing at least in part at the in-vehicle computing device $110_N$. In some implementations, the request may be transmitted to the suggestion service of the automated assistant application based on the OEM application determining one or more textual signals associated with the vehicle 100A and/or the user of the vehicle 100A satisfy one or more criteria, such as a vehicle state of the vehicle 100A indicating it has powered to the "on" state or a user state of the user of the vehicle 100A indicating the user has entered the vehicle (e.g., based on one or more occupancy sensors of the vehicle 100A). In additional or alternative implementations, the request may be transmitted to the suggestion service of the automated assistant application based on the OEM application as part of providing suggestions in a periodic manner.

Further, the suggestion service of the automated assistant application can transmit one or more of the suggestions to the OEM application and cause the OEM application to provide one or more of the suggestions for presentation to the user. For example, as shown in the example of FIG. 7, the first portion 722 of the display 720 that is dedicated to the OEM application includes a first suggestion 722A of "Check traffic along route to work", a second suggestion 722B of "Listen to local news", a third suggestion 722C of "Call spouse", a fourth suggestion 722D "Check fuel level", and a fifth suggestion 722E of "Check tire pressure". Further, the second portion 724 of the display 720 that is dedicated to an automated assistant application includes a suggestion 724A of "Press here for additional suggestions" that, when selected (e.g., via spoken input or touch input) can cause an additional request for one or more additional suggestions to be provided for presentation to the user of the vehicle 100A to be transmitted to the suggestion service of the automated assistant application. Moreover, the third portion 726 of the display 720 that is dedicated to a third-party media application includes a suggestion 726A of "Press here to play your artist" that, when selected (e.g., via spoken input or touch input) can cause music by a favorite artists of the user of the vehicle 100A to be played backed back for audible presentation to the user of the vehicle 100A via one or more speakers of the in-vehicle computing device $110_N$. The user of the vehicle 100A can select any of the above suggestions to cause corresponding actions associated with the suggestions to be initiated by the automated assistant application, the OEM application, and/or the third-party media application.

Notably, although the suggestions shown in FIG. 7 may be generated by the suggestion service of the automated assistant application, the suggestions are provided to the OEM application and/or the third-party media application to enable these various applications to provide the respective suggestions for presentation to the user of the vehicle 100A. Put another way, the automated assistant can donate the suggestions to various other applications upon request, and the various other applications can present the respective suggestions via respective portions of the display 720. Further, even if connections between the suggestion service of the automated assistant application, and the OEM application and/or the third-party media application fail, and/or versions these applications are not fully compatible, techniques described herein enable the suggestion service of the automated assistant to be robust to these connectivity and/or versioning issues, thereby resulting in an improved suggestion service for vehicles.

Figure 8:
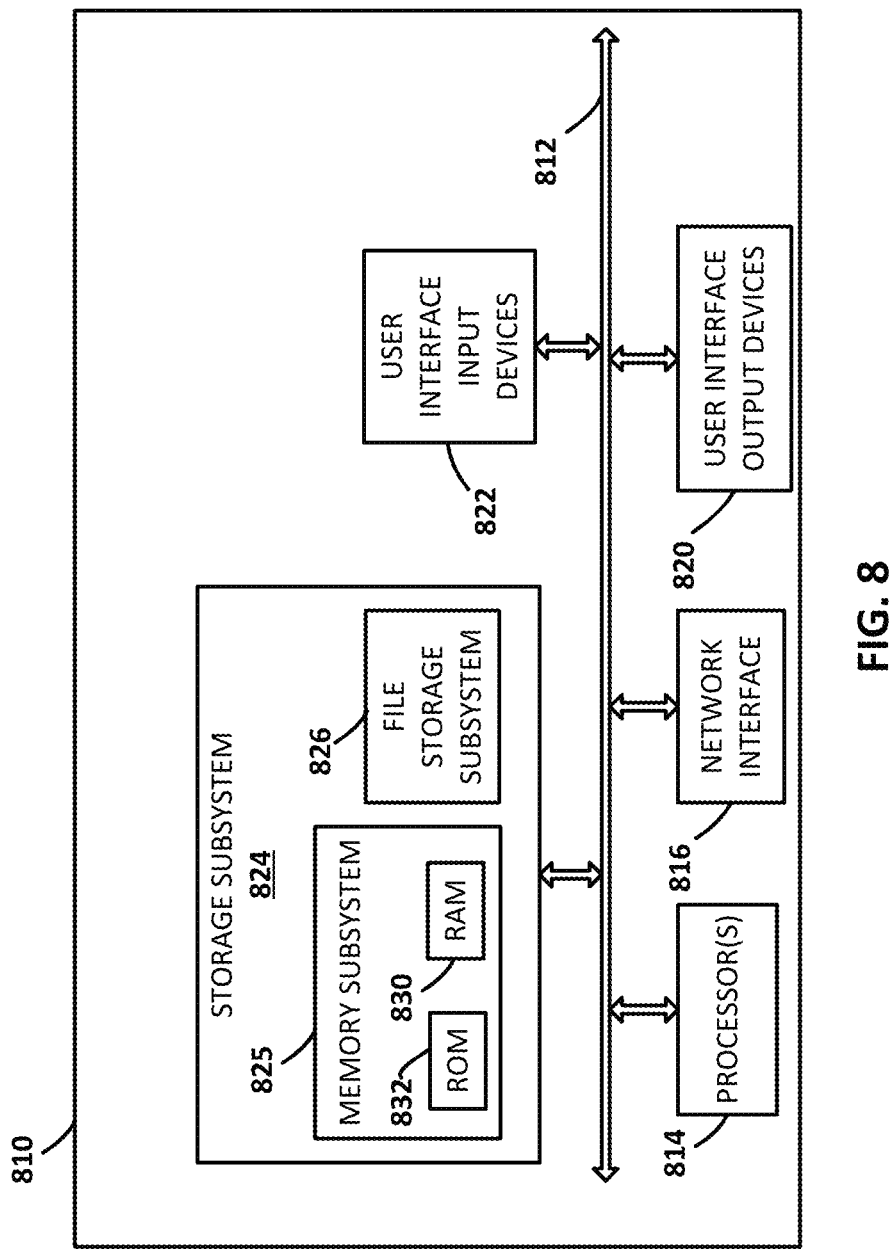
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more computing devices, one or more vehicles, and/or other component (s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1 and 2.

These software modules are generally executed by processor 814 alone or in combination with other processors. Memory 825 used in the storage subsystem 824 can include a number of memories including a main random-access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from an original equipment manufacturer (OEM) application of a vehicle of a user, a request for one or more suggestions to be provided for presentation to the user via an in-vehicle computing device of the vehicle of the user; in response to receiving the request for one or more of the suggestions to be provided for presentation to the user: obtaining, via a suggestion service of the automated assistant application, one or more of the suggestions to be provided for presentation to the user; and initializing a recurring system health check of the suggestion service of the automated assistant application to ensure a connection is maintained between at least the OEM application and the suggestion service of the automated assistant application; and subsequent to obtaining one or more of the suggestions to be provided for presentation to the user: transmitting, to the OEM application, one or more of the suggestions. Transmitting one or more of the suggestions to the OEM application causes one or more of the suggestions to be provided for presentation to the user via the in-vehicle computing device of the vehicle of the user.

These and other implementations of technology disclosed herein can optionally include one or more of the following features.

In some implementations, the request for one or more of the suggestions to be provided for presentation to the user may be received at a first time instance, of a plurality of time instances, and the recurring system health check of the suggestion service of the automated assistant application may be initialized at the first time instance. In some versions of those implementations, initializing the recurring system health check of the suggestion service of the automated assistant application may include identifying a corresponding timestamp associated with the first time instance; storing, in one or more databases accessible by the automated assistant application, the corresponding timestamp, associated with the first time instance, in association with one or more of the suggestions to be provided for presentation to the user based on the request received at the first time instance; and performing the recurring system health check of the suggestion service of the automated assistant application. In some further versions of those implementations, performing the recurring system health check of the suggestion service of the automated assistant application may include determining whether a difference between the first time instance and a second time instance, of the plurality of time instances, satisfies a temporal threshold, the second time instance being subsequent in time to the first time instance; and in response to determining that the difference between the first time instance and the second time instance satisfies the temporal threshold: testing the connection between at least the OEM application and the suggestion service of the automated assistant application.

In yet further versions of those implementations, the method may further include, in response to determining that the connection between at least the OEM application and the suggestion service of the automated assistant application is maintained: identifying an additional corresponding timestamp associated with the second time instance; storing, in one or more of the databases accessible by the automated assistant application, the additional corresponding timestamp associated with the second time instance in association with one or more of: one or more of the suggestions to be provided for presentation to the user based on the request received at the first time instance, or one or more additional suggestions to be provided for presentation to the user based on an additional request received at the second time instance; and continue performing the recurring system health check of the suggestion service of the automated assistant application.

In additional or alternative yet further versions of those implementations, the method may further include, in response to determining that the connection between at least the OEM application and the suggestion service of the automated assistant application has failed: re-establishing the connection between at least the OEM application and the suggestion service of the automated assistant application; retrieving, from one or more of the databases accessible by the automated assistant application, one or more of the suggestions stored in association with the corresponding timestamp associated with the first time instance; and re-transmitting, to the OEM application, one or more of the suggestions, wherein re-transmitting one or more of the suggestions to the OEM application causes one or more of the suggestions to be provided for presentation to the user via the in-vehicle computing device of the vehicle of the user.

In additional or alternative yet further versions of those implementations, the method may further include, in response to determining that the difference between the first time instance and the second time instance fails to satisfy the temporal threshold: determining whether a difference between the first time instance and a third time instance, of the plurality of time instances, satisfies the temporal threshold, the third time instance being subsequent in time to both the first time instance and the second time instance; and in response to determining that the difference between the first time instance and the third time instance satisfies the temporal threshold: testing the connection between at least the OEM application and the suggestion service of the automated assistant application.

In some implementations, the recurring system health check of the suggestion service of the automated assistant application may further ensure an additional connection is maintained between at least one or more additional third-party applications and the suggestion service of the automated assistant application. The one or more additional third-party application may be in addition to the OEM application and are in addition to the automated assistant application.

In some implementations, the request for one or more of the suggestions to be provided for presentation to the user may be received from the OEM application based on one or more contextual signals associated with the vehicle or the user of the vehicle. In some versions of those implementations, one or more of the contextual signals associated with the vehicle or the user of the vehicle may include one or both of: a state of the vehicle determined based on one or more sensor data instances generated by one or more corresponding sensors of the vehicle, or a state of the user of the vehicle determined based on one or more sensor data instances generated by one or more corresponding sensors of the vehicle or generated by one or more corresponding sensors of a mobile computing device of the user. In some further versions of those implementations, the state of the vehicle may include one or more of: the vehicle being powered on, the vehicle moving, the vehicle stopping, the vehicle being parked, the vehicle following a particular route, or the vehicle including additional occupants beyond the user. In additional or alternative further versions of those implementations, the state of the user of the vehicle may include one or more of: the user driving the vehicle, the user being a passenger of the vehicle, or an engagement level of the user while the vehicle is moving.

In some implementations, the request for one or more of the suggestions to be provided for presentation to the user may be received from the OEM application based on a duration of time lapsing since a prior request.

In some implementations, transmitting one or more of the suggestions to the OEM application may cause one or more of the suggestions to be provided for visual presentation to the user via an in-vehicle display of the in-vehicle computing device. In some versions of those implementations, one or more of the suggestions may be provided for visual presentation to the user via an OEM portion of the in-vehicle display that is associated with the OEM application and that is in addition to an automated assistant portion of the in-vehicle display that is associated with the automated assistant application.

In some implementations, transmitting one or more of the suggestions to the OEM application may cause one or more of the suggestions to be provided for audible presentation to the user via one or more in-vehicle speakers of the in-vehicle computing device of the vehicle of the user.

In some implementations, a method implemented by one or more processors is provided, and includes receiving, from an original equipment manufacturer (OEM) application of a vehicle of a user, a request for one or more suggestions to be provided for presentation to the user via an in-vehicle computing device of the vehicle of the user; in response to receiving the request for one or more of the suggestions to be provided presentation to the user: determining whether an OEM version of the OEM application is fully compatible with an automated assistant version of the automated assistant application; in response to determining that the OEM version of the OEM application is not fully compatible with the automated assistant version of the automated assistant application: processing, using a versioning application programming interface (API), the request to ensure compatibility between the OEM version of the OEM application and the automated assistant version of the automated assistant application; and obtaining, based on the processing using the versioning API and via a suggestion service of the automated assistant application, one or more of the suggestions to be provided for presentation to the user; and subsequent to obtaining one or more of the suggestions to be provided for presentation to the user based on the processing using the versioning API: transmitting, to the OEM application, one or more of the suggestions. Transmitting one or more of the suggestions to the OEM application causes one or more of the suggestions to be provided for presentation to the user via the in-vehicle computing device of the vehicle of the user.

These and other implementations of technology disclosed herein can optionally include one or more of the following features.

In some implementations, the OEM version of the OEM application may indicate at least a major OEM version indicator and a minor OEM version indicator, and the automated assistant version of the automated assistant application may indicate at least a major automated assistant version indicator and a minor automated assistant version indicator.

In some versions of those implementations, determining that the OEM version of the OEM application is not fully compatible with the automated assistant version of the automated assistant application may include determining that the OEM version of the OEM application is backwards compatible with the automated assistant version of the automated assistant application based on comparing one or more of: the major OEM version indicator and the major automated assistant version indicator, or the minor OEM version indicator and the minor automated assistant version indicator. In some further versions of those implementations, the method may further include, in response to determining that the OEM version of the OEM application is backwards compatible with the automated assistant version of the automated assistant application: processing, using a backwards compatibility version of the versioning API, the request to ensure backwards compatibility between the OEM version of the OEM application and the automated assistant version of the automated assistant application. In yet further versions of those implementations, the backwards compatibility version of the versioning API may include one or more components that are unique to the backwards compatibility version of the versioning API.

In some versions of those implementations, determining that the OEM version of the OEM application is not fully compatible with the automated assistant version of the automated assistant application may include determining that the OEM version of the OEM application is forwards compatible with the automated assistant version of the automated assistant application based on comparing one or more of: the major OEM version indicator and the major automated assistant version indicator, or the minor OEM version indicator and the minor automated assistant version indicator. In some further versions of those implementations, the method may further include, in response to determining that the OEM version of the OEM application is forwards compatible with the automated assistant version of the automated assistant application: processing, using a forwards compatibility version of the versioning API, the request to ensure forwards compatibility between the OEM version of the OEM application and the automated assistant version of the automated assistant application. In yet further versions of those implementations, the forwards compatibility version of the versioning API may include one or more components that are unique to the forwards compatibility version of the versioning API.

In some implementations, the method may further include, in response to receiving the request for one or more of the suggestions to be provided presentation to the user, determining whether one or more corresponding third-party versions of one or more third-party applications is fully compatible with the automated assistant version of the automated assistant application; and in response to determining that one or more of the corresponding third-party versions of one or more of the third-party applications is not fully compatible with the automated assistant version of the automated assistant application: processing, using the versioning API, the request to ensure compatibility between one or more of the corresponding third-party versions of one or more of the third-party applications and the automated assistant version of the automated assistant application.

In some versions of those implementations, the OEM version of the OEM application may indicate at least a major OEM version indicator and a minor OEM version indicator, the automated assistant version of the automated assistant application may indicate at least a major automated assistant version indicator and a minor automated assistant version indicator, and the one or more corresponding third-party versions of the one or more third-party applications may each indicate at least a corresponding major third-party version indicator and a corresponding minor third-party version indicator.

In some further versions of those implementations, determining that the one or more corresponding third-party versions of the one or more third-party applications is not fully compatible with the automated assistant version of the automated assistant application may include determining that one or more of the corresponding third-party versions of one or more of the third-party applications is backwards compatible or forwards compatible with the automated assistant version of the automated assistant application based on comparing one or more of: the corresponding major third-party version indicators and the major automated assistant version indicator, or the corresponding minor third-party version indicators and the minor automated assistant version indicator.

In yet further versions of those implementations, the method may further include, in response to determining that one or more of the corresponding third-party versions of one or more of the third-party applications is backwards compatible with the automated assistant version of the automated assistant application: processing, using a backwards compatibility version of the versioning API, the request to ensure forwards compatibility between one or more of the corresponding third-party versions of one or more of the third-party applications and the automated assistant version of the automated assistant application; and in response to determining that one or more of the corresponding third-party versions of one or more of the third-party applications is forwards compatible with the automated assistant version of the automated assistant application: processing, using a forwards compatibility version of the versioning API, the request to ensure forwards compatibility between one or more of the corresponding third-party versions of one or more of the third-party applications and the automated assistant version of the automated assistant application.

In even yet further versions of those implementations, the backwards compatibility version of the versioning API may include one or more components that are unique to the backwards compatibility version of the versioning API, and the forwards compatibility version of the versioning API may include one or more additional components that are unique to the forwards compatibility version of the versioning API.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors executing an automated assistant application, the method comprising:
receiving, from an original equipment manufacturer (OEM) application of a vehicle of a user, a request for one or more suggestions to be provided for presentation to the user via an in-vehicle computing device of the vehicle of the user;
in response to receiving the request for one or more of the suggestions to be provided for presentation to the user:
obtaining, via a suggestion service of the automated assistant application, one or more of the suggestions to be provided for presentation to the user; and
initializing a recurring system health check of the suggestion service of the automated assistant application to ensure a connection is maintained between at least the OEM application and the suggestion service of the automated assistant application,
wherein the request for one or more of the suggestions to be provided for presentation to the user is received at a first time instance, of a plurality of time instances, and
wherein the recurring system health check of the suggestion service of the automated assistant application is initialized at the first time instance; and
performing the recurring system health check of the suggestion service of the automated assistant application to ensure the connection is maintained between at least the OEM application and the suggestion service of the automated assistant application, wherein performing the recurring system health check comprises:
determining whether a difference between the first time instance and a second time instance, of the plurality of time instances, satisfies a temporal threshold,
wherein the second time instance is subsequent in time to the first time instance, and
wherein the second time instance is determined based on a predicted time that the OEM application is predicted to request, from the suggestion service of the automated assistant application, one or more additional suggestions to be provided for presentation to the user via the in-vehicle computing device of the vehicle;
determining that the difference between the first time instance and the second time instance satisfies the temporal threshold; and
in response to determining that the difference between the first time instance and the second time instance satisfies the temporal threshold:
testing the connection between at least the OEM application and the suggestion service of the automated assistant application; and
subsequent to obtaining one or more of the suggestions to be provided for presentation to the user:
transmitting, to the OEM application, one or more of the suggestions, wherein transmitting one or more of the suggestions to the OEM application causes one or more of the suggestions to be provided for presentation to the user via the in-vehicle computing device of the vehicle of the user.

2. The method of claim 1, wherein initializing the recurring system health check of the suggestion service of the automated assistant application comprises:
identifying a corresponding timestamp associated with the first time instance; and
storing, in one or more databases accessible by the automated assistant application, the corresponding timestamp, associated with the first time instance, in association with one or more of the suggestions to be provided for presentation to the user based on the request received at the first time instance.

3. The method of claim 2, further comprising:
determining, based on testing the connection between at least the OEM application and the suggestion service of the automated assistant application, that the connection between at least the OEM application and the suggestion service of the automated assistant application is maintained; and
in response to determining that the connection between at least the OEM application and the suggestion service of the automated assistant application is maintained:
identifying an additional corresponding timestamp associated with the second time instance;
storing, in one or more of the databases accessible by the automated assistant application, the additional corresponding timestamp associated with the second time instance in association with one or more of:
one or more of the suggestions to be provided for presentation to the user based on the request received at the first time instance, or
one or more additional suggestions to be provided for presentation to the user based on an additional request received at the second time instance; and
continue performing the recurring system health check of the suggestion service of the automated assistant application.

4. The method of claim 2, further comprising:
determining, based on testing the connection between at least the OEM application and the suggestion service of the automated assistant application, that the connection between at least the OEM application and the suggestion service of the automated assistant application has failed; and
in response to determining that the connection between at least the OEM application and the suggestion service of the automated assistant application has failed:
re-establishing the connection between at least the OEM application and the suggestion service of the automated assistant application;
retrieving, from one or more of the databases accessible by the automated assistant application, one or more of the suggestions stored in association with the corresponding timestamp associated with the first time instance; and
re-transmitting, to the OEM application, one or more of the suggestions, wherein re-transmitting one or more of the suggestions to the OEM application causes one or more of the suggestions to be provided for presentation to the user via the in-vehicle computing device of the vehicle of the user.

5. The method of claim 1, wherein the recurring system health check of the suggestion service of the automated assistant application further ensures an additional connection is maintained between at least one or more additional third-party applications and the suggestion service of the automated assistant application, wherein the one or more additional third-party applications are in addition to the OEM application and are in addition to the automated assistant application.

6. The method of claim 1, wherein the request for one or more of the suggestions to be provided for presentation to the user is received from the OEM application based on one or more contextual signals associated with the vehicle or the user of the vehicle.

7. The method of claim 6, wherein one or more of the contextual signals associated with the vehicle or the user of the vehicle comprise one or both of: a state of the vehicle determined based on one or more sensor data instances generated by one or more corresponding sensors of the vehicle, or a state of the user of the vehicle determined based on one or more sensor data instances generated by one or more corresponding sensors of the vehicle or generated by one or more corresponding sensors of a mobile computing device of the user.

8. The method of claim 7,
wherein the state of the vehicle comprises one or more of: the vehicle being powered on, the vehicle moving, the vehicle stopping, the vehicle being parked, the vehicle following a particular route, or the vehicle including additional occupants beyond the user, or
wherein the state of the user of the vehicle comprises one or more of: the user driving the vehicle, the user being a passenger of the vehicle, or an engagement level of the user while the vehicle is moving.

9. A system comprising:
at least one processor; and
memory storing instructions that, when executed, cause the at least one processor to:
 receive, from an original equipment manufacturer (OEM) application of a vehicle of a user, a request for one or more suggestions to be provided for presentation to the user via an in-vehicle computing device of the vehicle of the user;
 in response to receiving the request for one or more of the suggestions to be provided for presentation to the user:
  obtain, via a suggestion service of the automated assistant application, one or more of the suggestions to be provided for presentation to the user; and
  initialize a recurring system health check of the suggestion service of the automated assistant application to ensure a connection is maintained between at least the OEM application and the suggestion service of the automated assistant application,
   wherein the request for one or more of the suggestions to be provided for presentation to the user is received at a first time instance, of a plurality of time instances, and
   wherein the recurring system health check of the suggestion service of the automated assistant application is initialized at the first time instance; and
  perform the recurring system health check of the suggestion service of the automated assistant application to ensure the connection is maintained between at least the OEM application and the suggestion service of the automated assistant application, wherein the instructions to perform the recurring system health check comprise instructions to:
   determine whether a difference between the first time instance and a second time instance, of the plurality of time instances, satisfies a temporal threshold,
    wherein the second time instance is subsequent in time to the first time instance, and
    wherein the second time instance is determined based on a predicted time that the OEM application is predicted to request, from the suggestion service of the automated assistant application, one or more additional suggestions to be provided for presentation to the user via the in-vehicle computing device of the vehicle;
   determine that the difference between the first time instance and the second time instance satisfies the temporal threshold; and
   in response to determining that the difference between the first time instance and the second time instance satisfies the temporal threshold:
    test the connection between at least the OEM application and the suggestion service of the automated assistant application; and
  subsequent to obtaining one or more of the suggestions to be provided for presentation to the user:
  transmit, to the OEM application, one or more of the suggestions, wherein transmitting one or more of the suggestions to the OEM application causes one or more of the suggestions to be provided for presentation to the user via the in-vehicle computing device of the vehicle of the user.

10. The system of claim 9, wherein the instructions to initialize the recurring system health check of the suggestion service of the automated assistant application comprise instructions to:
 identify a corresponding timestamp associated with the first time instance; and
 store, in one or more databases accessible by the automated assistant application, the corresponding timestamp, associated with the first time instance, in association with one or more of the suggestions to be provided for presentation to the user based on the request received at the first time instance.

11. The system of claim 10, wherein the instructions further cause the at least one processor to:
 determine, based on testing the connection between at least the OEM application and the suggestion service of the automated assistant application, that the connection between at least the OEM application and the suggestion service of the automated assistant application is maintained; and
 in response to determining that the connection between at least the OEM application and the suggestion service of the automated assistant application is maintained:
  identify an additional corresponding timestamp associated with the second time instance;

store, in one or more of the databases accessible by the automated assistant application, the additional corresponding timestamp associated with the second time instance in association with one or more of:
one or more of the suggestions to be provided for presentation to the user based on the request received at the first time instance, or
one or more additional suggestions to be provided for presentation to the user based on an additional request received at the second time instance; and
continue performance of the recurring system health check of the suggestion service of the automated assistant application.

12. The system of claim 10, wherein the instructions further cause the at least one processor to:
determine, based on testing the connection between at least the OEM application and the suggestion service of the automated assistant application, that the connection between at least the OEM application and the suggestion service of the automated assistant application has failed; and
in response to determining that the connection between at least the OEM application and the suggestion service of the automated assistant application has failed:
re-establish the connection between at least the OEM application and the suggestion service of the automated assistant application;
retrieve, from one or more of the databases accessible by the automated assistant application, one or more of the suggestions stored in association with the corresponding timestamp associated with the first time instance; and
re-transmit, to the OEM application, one or more of the suggestions, wherein re-transmitting one or more of the suggestions to the OEM application causes one or more of the suggestions to be provided for presentation to the user via the in-vehicle computing device of the vehicle of the user.

13. The system of claim 9, wherein the recurring system health check of the suggestion service of the automated assistant application further ensures an additional connection is maintained between at least one or more additional third-party applications and the suggestion service of the automated assistant application, wherein the one or more additional third-party applications are in addition to the OEM application and are in addition to the automated assistant application.

14. A non-transitory computer-readable storage medium storing instructions that, when executed, cause one or more processors to be operable to perform operations, the operations comprising:
receiving, from an original equipment manufacturer (OEM) application of a vehicle of a user, a request for one or more suggestions to be provided for presentation to the user via an in-vehicle computing device of the vehicle of the user;
in response to receiving the request for one or more of the suggestions to be provided for presentation to the user:
obtaining, via a suggestion service of the automated assistant application, one or more of the suggestions to be provided for presentation to the user; and
initializing a recurring system health check of the suggestion service of the automated assistant application to ensure a connection is maintained between at least the OEM application and the suggestion service of the automated assistant application,
wherein the request for one or more of the suggestions to be provided for presentation to the user is received at a first time instance, of a plurality of time instances, and
wherein the recurring system health check of the suggestion service of the automated assistant application is initialized at the first time instance; and
performing the recurring system health check of the suggestion service of the automated assistant application to ensure the connection is maintained between at least the OEM application and the suggestion service of the automated assistant application, wherein performing the recurring system health check comprises:
determining whether a difference between the first time instance and a second time instance, of the plurality of time instances, satisfies a temporal threshold,
wherein the second time instance is subsequent in time to the first time instance, and
wherein the second time instance is determined based on a predicted time that the OEM application is predicted to request, from the suggestion service of the automated assistant application, one or more additional suggestions to be provided for presentation to the user via the in-vehicle computing device of the vehicle;
determining that the difference between the first time instance and the second time instance satisfies the temporal threshold; and
in response to determining that the difference between the first time instance and the second time instance satisfies the temporal threshold:
testing the connection between at least the OEM application and the suggestion service of the automated assistant application; and
subsequent to obtaining one or more of the suggestions to be provided for presentation to the user:
transmitting, to the OEM application, one or more of the suggestions, wherein transmitting one or more of the suggestions to the OEM application causes one or more of the suggestions to be provided for presentation to the user via the in-vehicle computing device of the vehicle of the user.

15. The non-transitory computer-readable storage medium of claim 14, wherein initializing the recurring system health check of the suggestion service of the automated assistant application comprises:
identifying a corresponding timestamp associated with the first time instance; and
storing, in one or more databases accessible by the automated assistant application, the corresponding timestamp, associated with the first time instance, in association with one or more of the suggestions to be provided for presentation to the user based on the request received at the first time instance.

16. The non-transitory computer-readable storage medium of claim 15, the operations further comprising:
determining, based on testing the connection between at least the OEM application and the suggestion service of the automated assistant application, that the connection between at least the OEM application and the suggestion service of the automated assistant application is maintained; and in response to determining that the connection between at least the OEM application and the suggestion service of the automated assistant application is maintained:
  identifying an additional corresponding timestamp associated with the second time instance;
  storing, in one or more of the databases accessible by the automated assistant application, the additional corresponding timestamp associated with the second time instance in association with one or more of:
    one or more of the suggestions to be provided for presentation to the user based on the request received at the first time instance, or
    one or more additional suggestions to be provided for presentation to the user based on an additional request received at the second time instance; and
  continue performing the recurring system health check of the suggestion service of the automated assistant application.

17. The non-transitory computer-readable storage medium of claim 15, the operations further comprising:
  determining, based on testing the connection between at least the OEM application and the suggestion service of the automated assistant application, that the connection between at least the OEM application and the suggestion service of the automated assistant application has failed; and
  in response to determining that the connection between at least the OEM application and the suggestion service of the automated assistant application has failed:
    re-establishing the connection between at least the OEM application and the suggestion service of the automated assistant application;
    retrieving, from one or more of the databases accessible by the automated assistant application, one or more of the suggestions stored in association with the corresponding timestamp associated with the first time instance; and
    re-transmitting, to the OEM application, one or more of the suggestions, wherein re-transmitting one or more of the suggestions to the OEM application causes one or more of the suggestions to be provided for presentation to the user via the in-vehicle computing device of the vehicle of the user.

18. The non-transitory computer-readable storage medium of claim 14, wherein the recurring system health check of the suggestion service of the automated assistant application further ensures an additional connection is maintained between at least one or more additional third-party applications and the suggestion service of the automated assistant application, wherein the one or more additional third-party applications are in addition to the OEM application and are in addition to the automated assistant application.

19. The non-transitory computer-readable storage medium of claim 14, wherein the request for one or more of the suggestions to be provided for presentation to the user is received from the OEM application based on one or more contextual signals associated with the vehicle or the user of the vehicle.

20. The non-transitory computer-readable storage medium of claim 19, wherein one or more of the contextual signals associated with the vehicle or the user of the vehicle comprise one or both of: a state of the vehicle determined based on one or more sensor data instances generated by one or more corresponding sensors of the vehicle, or a state of the user of the vehicle determined based on one or more sensor data instances generated by one or more corresponding sensors of the vehicle or generated by one or more corresponding sensors of a mobile computing device of the user.

\* \* \* \* \*